Oct. 20, 1959  F. D. GUGELER  2,909,189
BALANCED VALVE
Filed Feb. 5, 1957  5 Sheets-Sheet 1
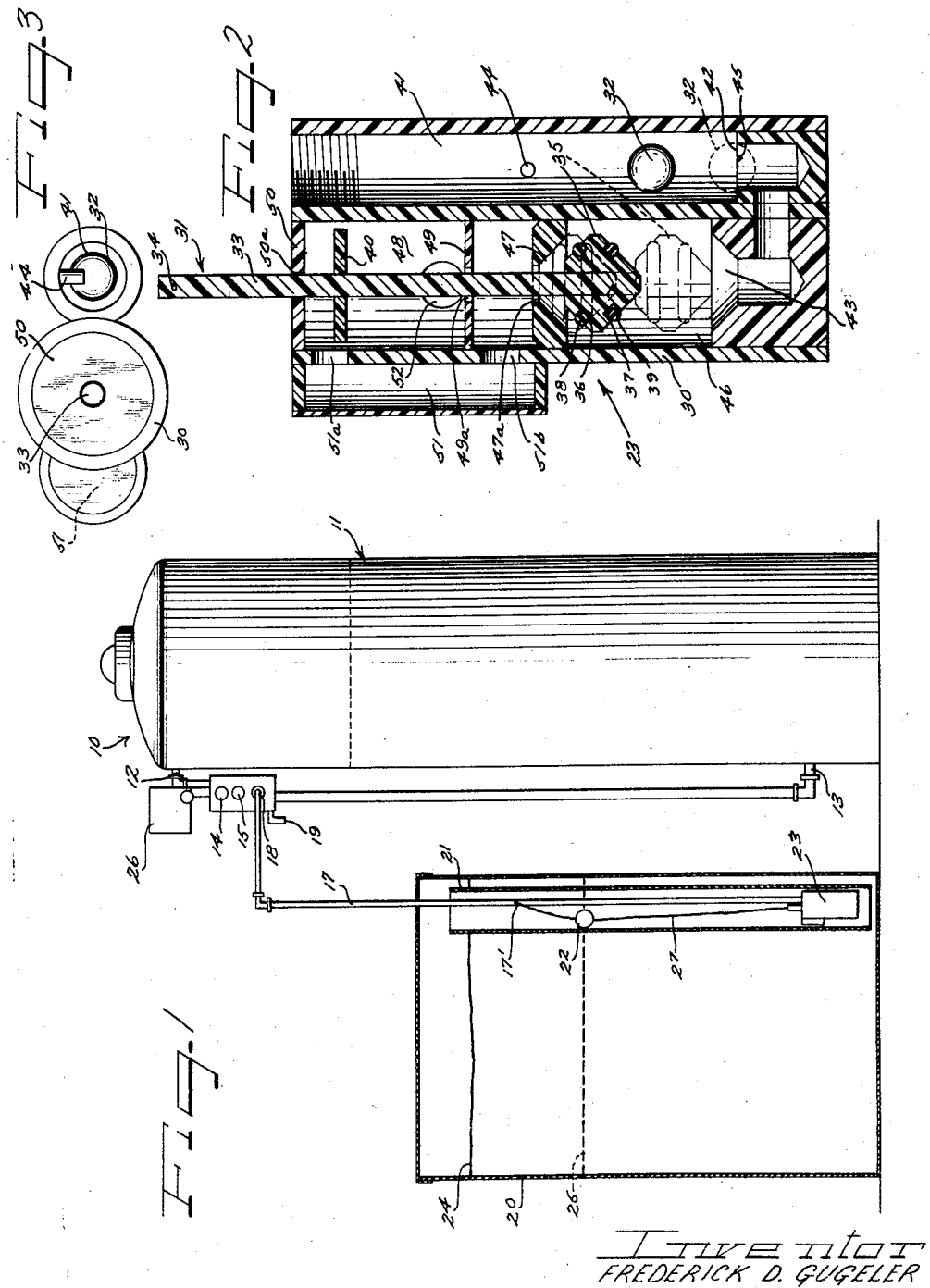
Inventor
FREDERICK D. GUGELER
By Hill, Sherman, Meroni, Gross & Simpson Attys Oct. 20, 1959  F. D. GUGELER  2,909,189
BALANCED VALVE
Filed Feb. 5, 1957  5 Sheets-Sheet 2
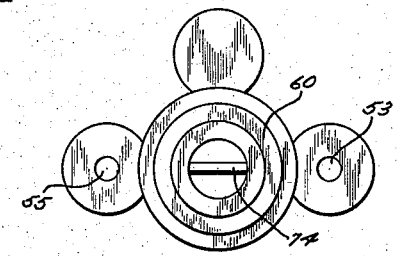
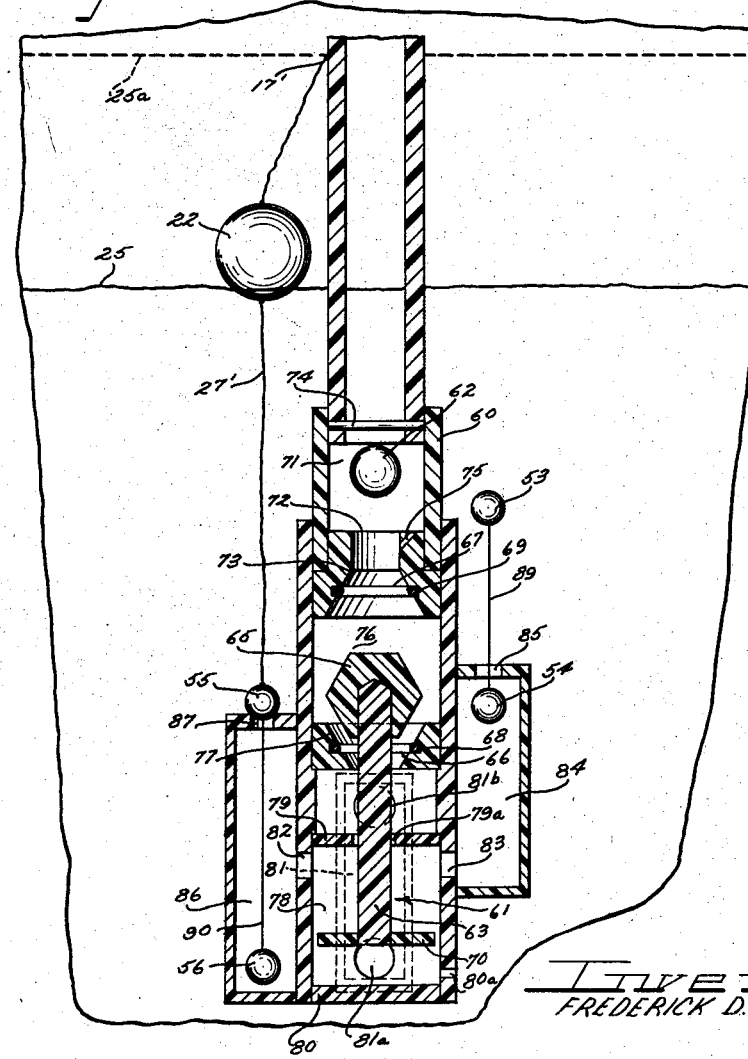
Inventor
FREDERICK D. GUGELER
by Hill, Sherman, Meroni, Gross & Simpson Attys

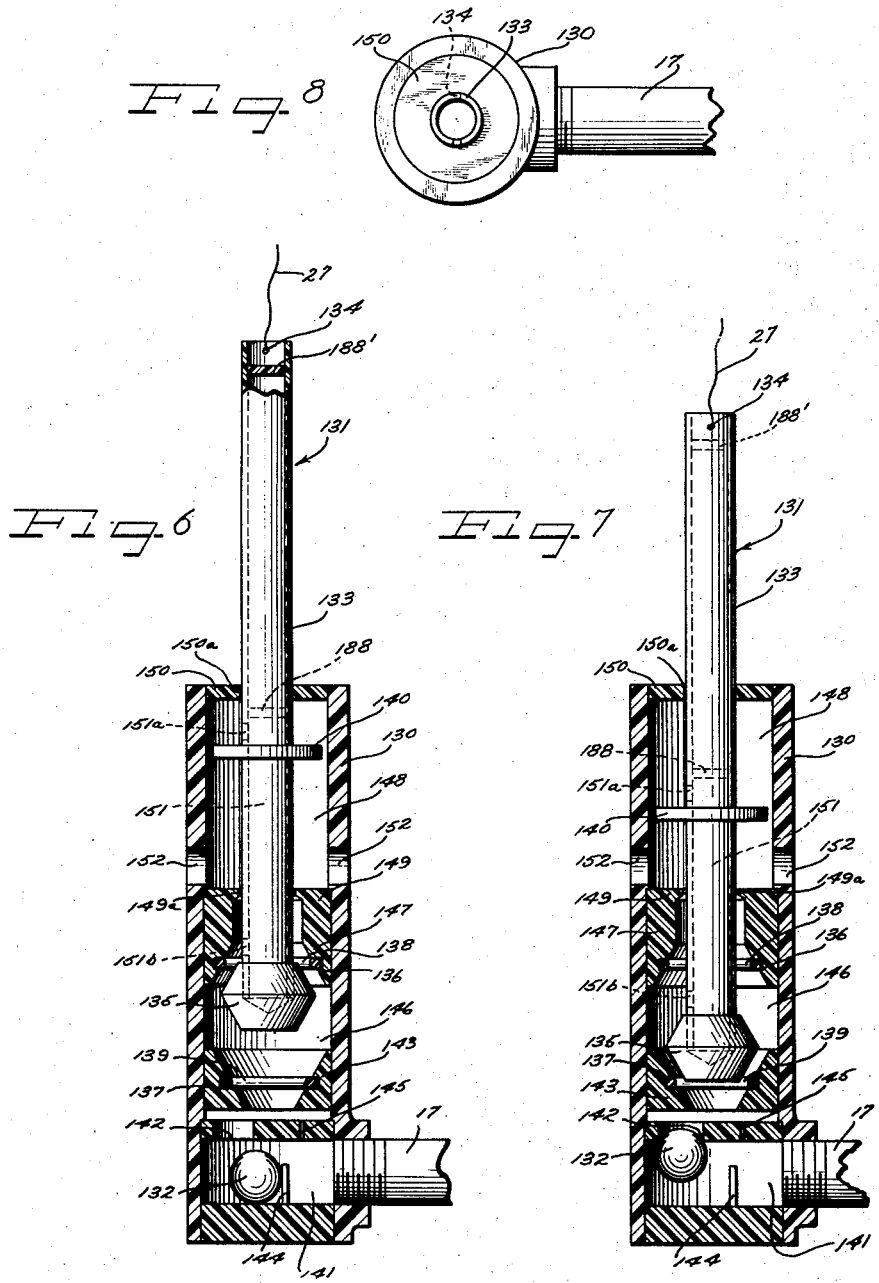

Oct. 20, 1959 F. D. GUGELER 2,909,189
BALANCED VALVE
Filed Feb. 5, 1957 5 Sheets-Sheet 4
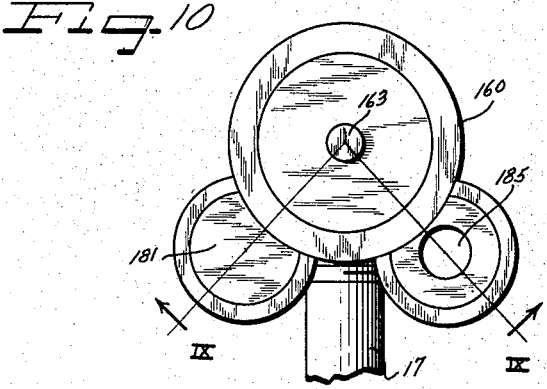
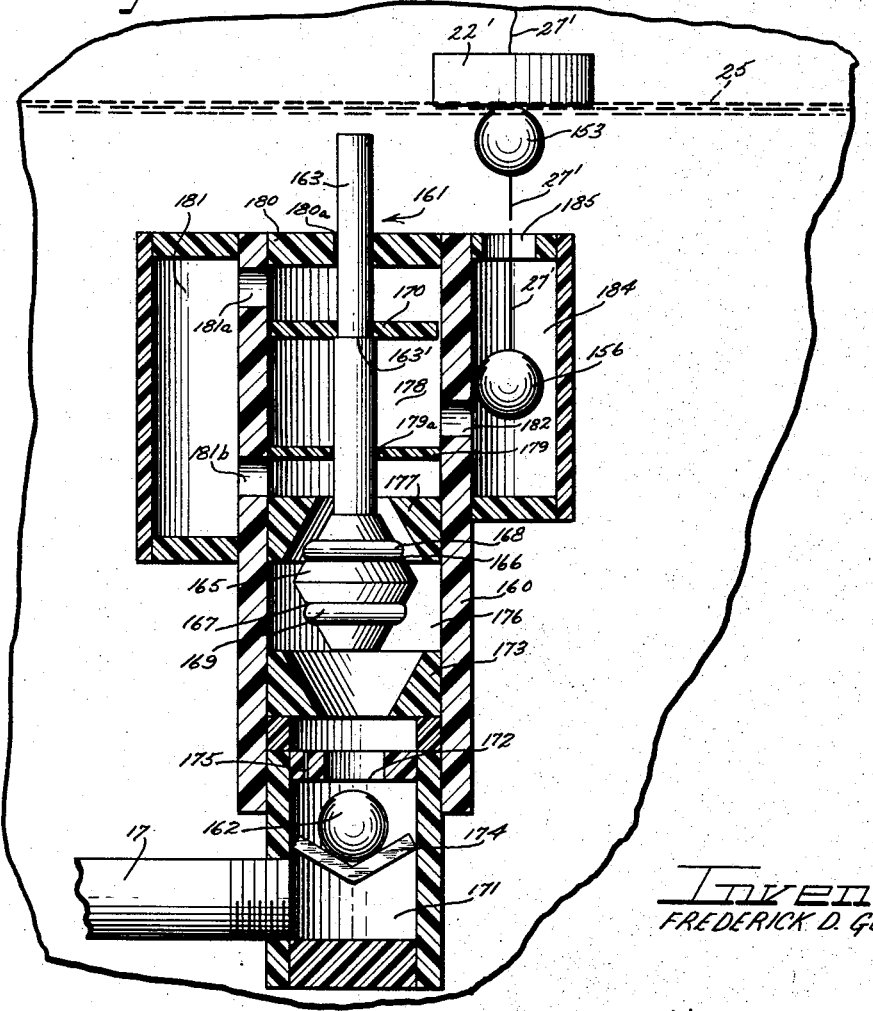
Inventor
FREDERICK D. GUGELER Oct. 20, 1959 F. D. GUGELER 2,909,189
BALANCED VALVE
Filed Feb. 5, 1957 5 Sheets-Sheet 5
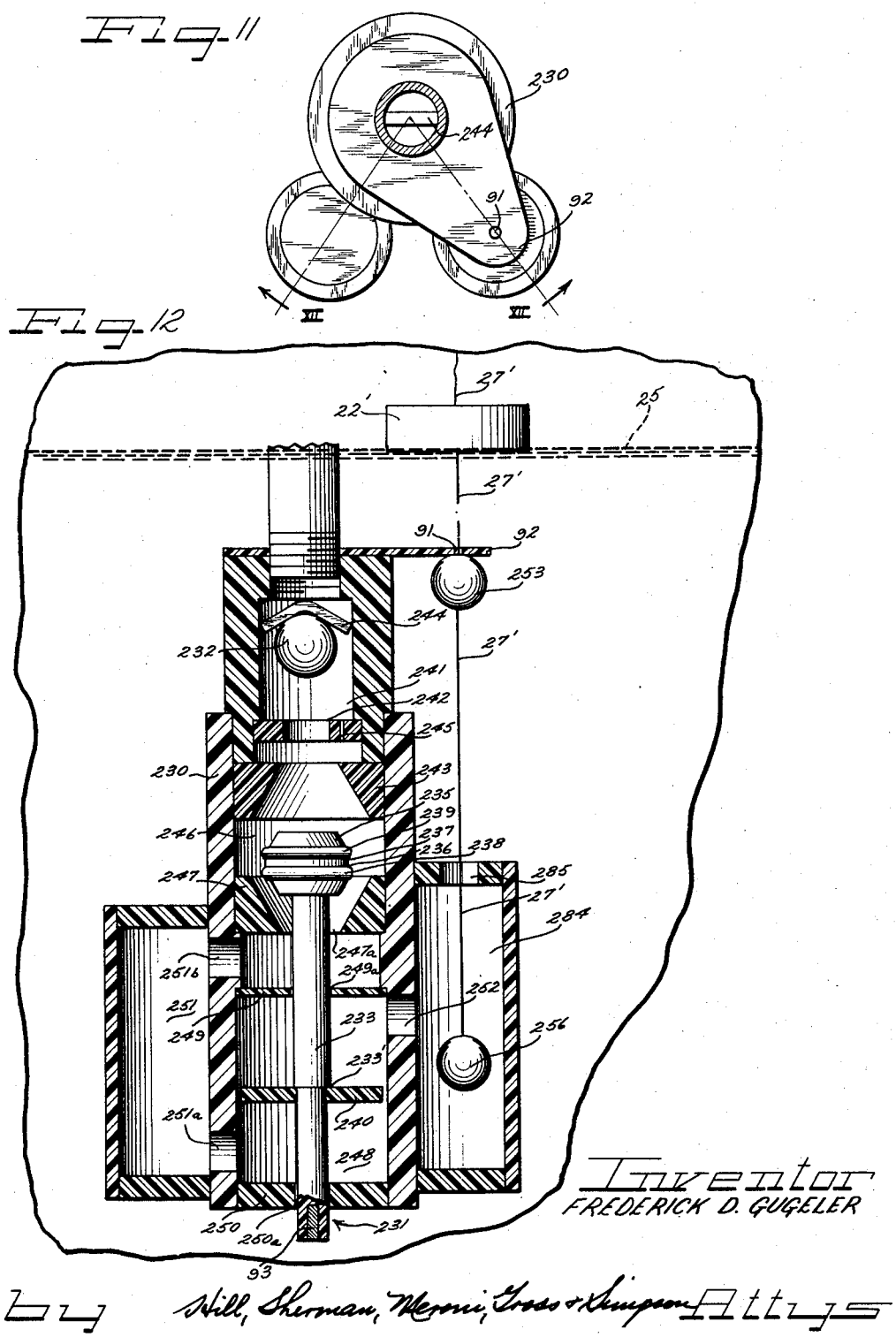
Inventor
FREDERICK D. GUGELER
by Hill, Sherman, Meroni, Gross & Simpson Attys

United States Patent Office 2,909,189
Patented Oct. 20, 1959

2,909,189

BALANCED VALVE

Frederick D. Gugeler, Lombard, Ill.

Application February 5, 1957, Serial No. 638,275

23 Claims. (Cl. 137—391)

This invention relates to a valve, and more specifically to a hydrostatically and hydrodynamically balanced valve.

This valve, in combination with other control means, may be used in a brine tank in the automatic regeneration of water softeners. Water softeners are commonly utilized to chemically treat a water supply so as to remove minerals therefrom which cause hardness in water. After a certain amount of use, such a softener requires regeneration. Such regeneration may be accomplished either manually or, more preferably, by automatic means.

In order that the operation and requirements of the control valve which is the subject of this invention may be more fully understood, the operation and recharging of water softeners in general is briefly reviewed. It is known that various chemical compositions have the property of being able to engage in a cation exchange under the proper circumstances. Included among these are such materials as zeolites and certain synthetic resins. When granular particles of siliceous zeolite or resin are introduced into a stream of hard water, a cation exchange takes place. This exchange is utilized in the softening of water. Thus if a zeolite containing sodium as a base is brought into contact with a solution containing lime, or lime and magnesia, the zeolite will give up its sodium cation to the solution, and take up as a new base the lime base or the bases of the lime and magnesia. When this has been done, and the resulting compositions are brought into contact with a solution containing sodium, that is a salt solution or brine, they give up the lime base, or bases of the lime and magnesia, and take back their original sodium base. The cation exchange and re-exchange may continue practically indefinitely and with little or no wear. Thus by this method of cation exchange, water may be rendered soft by removal of lime or magnesia, and the chemical may be regenerated by a salt solution.

It is also apparent that when water is passed through a granular bed of chemicals, mechanically suspended impurities in the water will be removed by the filtering action of this bed of granules. Thus, if a chemical having a sodium base is used, the process consists, generally speaking, of the absorption of magnesia and calcium by the siliceous material, which has the exchange properties, and the release by the zeolite of sodium, which latter substance remains unobjectionably in the water. Effectiveness of zeolite diminishes in proportion to its use and it is restored by regenerating the zeolite with a solution of common salt. Of course the hardness varies with the level of ground water, with the area where it is obtained, and with the season. Accordingly any one of several different materials may be used so as to enable the removal of whatever hardness causing chemicals might be present.

Thus in the utilization of such softening chemicals, namely in a water softener, nothing more is fundamentally required than a tank containing such chemical, and through which the water to be softened is filteringly passed. The better water softeners bring the hard water in at the top and cause it to flow downward through the bed of chemicals. Thus the bed stops most of the slimy and mechanical impurities near its top. The water may continue flowing through the bed of chemicals, thereby permitting the cation exchange. The softened water is drawn off at the bottom and is led to the distribution system. When the chemicals are agitated, the smaller granules will settle toward the top of the bed and the coarser granules will settle at the bottom. Because of this fact, superior filtration will take place by bringing the hard water in above the granule bed. If filtration is not important, it is immaterial which direction the water flows. After softening has continued for a volume of flow, the efficiency of the granule bed will have decreased, thereby necessitating recharging. Preferably the granules are first backwashed by flowing water in the opposite direction through the filter bed, such backwashed water being directed to a drain. It is preferable to backwash before the unit is recharged so that the granules will have been mechanically cleaned, readying them for regeneration. Another advantage in backwashing prior to recharging is that hard water will be used for that purpose instead of soft water. This backwashing is particularly effective in stirring up the bed causing the coarser particles to settle downward and the finer particles upward. After backwashing, the chemical bed is regenerated by passing a saline or salt solution through the bed along the coarse taken by the hard water during normal usage. However, this used brine solution is also directed to the drain when it leaves the softener. The saline solution deposits its sodium cation and picks up the lime and magnesia cations which then pass down the drain in the solution. Since salt is objectionable to the taste, some rinsing of the granules is necessary. This process should not be continued too long because the cation exchange will eventually move in the opposite direction, thus again destroying the efficiency of the softener. This will also take place in time if the material removed in the ion exchange from the granules is not flushed out by use of rinse water.

Users of softeners of this type have found it to be quite cumbersome to manually recharge the softeners with salt. Accordingly, auxiliary brine tanks are utilized into which the salt is placed. With appropriate automatic controls on the water softener and associated with the brine tank, the entire foregoing process may be completed automatically. Apart from the labor-saving effect, the result of proper control is that there will be less waste of brine solution, less waste of backwash and rinse water, over-rinsing of the granules will be avoided and thereby they will be left in condition for maximum efficiency of operation, and, quite importantly, air is not drawn into the system.

The controls which make possible the automatic carrying out of this include a totalizing meter which determines the extent of usage of the water softener. An alternate to the totalizing meter would be the use of a timer set to cause periodic regeneration of the unit, preferably during some point of non-use such as during the night or during the weekend. Whether flow rate is accumulated or whether time is accumulated, the accumulator eventually actuates a sequential timer which operates a group of solenoid valves associated together to cause the proper flow connections to be made. During a normal softening cycle, hard water is brought in through an inlet and directed to the top of the softener. It is then collected at the bottom of the softener and thence directed to the distribution system. During this cycle the drain is closed and water is brought from one of the ports of the ejector to the pipe leading to a separate brine tank. Upon the backwash cycle, hard water comes into the inlet and is thence directed to the distribution system. A branch leads from the inlet to the bottom of the tank; thence through the granules and out the top of the tank to the drain. Pressure may also be optionally available at the pipe leading to the brine tank during this cycle. A third arrangement of the control valves is necessary for the regeneration cycle. Under this condition, hard water is brought into the inlet and to the distribution system. Water is also brought into the inlet of the ejector and is discharged therefrom and is directed to that end of the softening tank to which hard water is normally directed when it is being softened. As already mentioned preferably this is the top end of the tank. The ejector is basically a venturi or aspirator which places a suction on the transverse fitting. This source of suction is connected to the brine tank pipe which thereby sucks in or aspirates a saturated brine solution with other water which is then flowed through the granules to recharge them. When the proper amount of saturated salt solution has been brought into the softener tank, the flow of such brine is caused to stop. However, the hard water is continually flowed through the granules so as to rinse out any of the remaining free minerals or salts. When this rinsing action has been completed, the valves are automatically restored to the softening cycle. At this point, accumulation of time or flow again begins and the cycle is repeated.

From the foregoing description of the softener and its operation, it is apparent that an additional control is necessary in the brine tank to shut off the supply of hard water to the brine tank when it is sufficiently full, to thereby prevent overflowing. Flow controls coupled with a solenoid valve operated by a sequential timer have been found to be not entirely satisfactory. Such a control does not sense the fullness of the tank, and in that it does not respond to the fullness of the tank, it merely acts after a predetermined length of time. If such a control be used, the third above-described cycle may actually consist of two cycles, namely the portion during which regeneration is occurring followed by a portion where only rinsing is occurring, such rinse being directed toward the drain.

The instant invention deals with a control to be used in a system for softening water in which a brine solution is aspirated from a brine tank through a pipe and in which the water thus removed is replaced through the same pipe. Accordingly, applicant has provided a brine tank valve control which senses water level in the brine tank both for determining that the tank is sufficiently full and for determining that a sufficient quantity of brine has been aspirated into the softener. The control also determines whether there is a positive or a negative pressure on the brine tank line and functions to shut off the incoming water only on a positive pressure and functions to stop the supply of saline solution only on negative pressure. Stated otherwise, this invention pertains to a valve which when supplied with a positive pressure, acts to sense water level and to block such incoming water coming at a positive pressure when the proper level has been reached. The valve also senses negative pressure at the same port and permits the removal of saline solution until the level in the brine tank has reached a predetermined lower height.

Therefore, it is an object of this invention to provide a brine tank valve which will control the volume of brine that will be drawn into a water softener during regeneration.

It is a further object of this invention to provide a brine tank valve which will act to shut off the inflow of water to the brine tank when a predetermined level has been reached.

It is an object of this invention to provide a trigger mechanism which will cause a valve to close when a predetermined level has been reached.

It is a further object of this invention to provide a valve means which will utilize incoming fluid pressure to close the valve.

It is an object of this invention to provide a float valve coupled with the use of incoming pressure triggered by said float to close said valve.

One of the main objects of this invention is to provide a hydrostatically and hydrodynamically balanced valve which will seek a position and maintain it stably during flow conditions.

It is another object of this invention to provide a hydrostatically and hydrodynamically balanced valve having a bypass structure associated with the balancing means.

It is an object of this invention to provide a low-cost and simple brine tank valve.

Yet another object is the provision of a brine tank valve which is functional only to shut off flows.

Numerous other objects, features and advantages of this invention will be apparent from the following detailed description of the attached sheets of drawings, which, by way of several species, illustrates the invention.

In the drawings:

Figure 1 is an elevational schematic view of a water softener and brine tank showing the installation of a brine tank valve.

Figure 2 is an enlarged elevational view in cross section of the brine tank valve shown in Figure 1.

Figure 3 is a top view of the valve shown in Figure 2.

Figure 4 is a cross-sectional view of a modified form of a brine tank valve.

Figure 5 is a top view of the valve shown in Figure 4.

Figure 6 shows in section another modified form of brine tank valve with the main valve positioned to draw brine from the brine tank.

Figure 7 shows the brine tank valve of Figure 6 but with the main valve positioned to refill the brine tank.

Figure 8 is a top view of the valve of Figure 6.

Figure 9 shows in section a still further modification of this invention as viewed generally at IX—IX of Figure 10, but with the pipe fitting rotated for clarity.

Figure 10 shows a top view of the valve of Figure 9.

Figure 11 shows a top view of yet another modification of the valve; and

Figure 12 shows in section the valve of Figure 11, generally along line XII—XII.

As shown on the drawings:

Referring to Figure 1, there is seen an automatic water softener having controls therefor. The softener tank 10 is filled with cation exchange granules up to approximately the point indicated by numeral 11; a top fitting 12 extends to an internal top distributor (not shown) while numeral 13 indicates a fitting extending to the bottom internal distributor (not shown).

While these components have been called distributors, it is apparent that they also serve as collectors. A hard water source is connected to inlet 14, the distribution system is connected to outlet 15, and the brine tank pipe or fluid conduit 17 is connected to the port 18. Another fitting 19 is a drain fitting which may be directed to any suitable place for discharging the contaminated water. To the left of the softener tank 10 is brine tank 20 having a brine valve well 21. The well 21 comprises a tubular member open at its top and at its bottom and suitably secured to the brine tank 20. The valve well 21 may be finely perforated through its walls if desired. This well functions to keep salt crystals from fouling the float 22 which is connected to the brine tank valve 23, as well as from fouling the moving parts of valve 23 itself. As illustrated, the salt crystals have been placed in the brine tank 20 up to a level 24 while water has been added thereto which fills the voids between the salt crystals up to level 25. A control such as a flow or time accumulator and a sequence timer are indicated by numeral 26 which control a group of internally carried solenoid valves which in turn are connected to the inlet 12, the outlet 13, the brine tank pipe 17, the drain 19, the distribution system port 15 and to an internal ejector or aspirator (not shown). It will be apparent that none of the details of this automatic water softener form a part of the instant invention except portions contained within the brine tank 20. These other details are included, however, and described, to enable better understanding of the operation of the brine tank valves disclosed herein.

The brine tank valve 23 is shown installed at the bottom of the brine valve well 21, being held in position by brine tank pipe 17. A buoyant float 22 is secured to a line 27, preferably of plastic monofilament such as nylon, which is fastened at its upper end such as to the brine pipe 17 at 17' and which is fastened at its lower end to a movable element of valve 23. It will be noted that when the water risingly reaches a level approximately as shown at 25, a tension will be placed by float 22 on line 27 and thereby an upward force will be applied to the valve. It will also be seen that if the water level 25 be lowered, there is no such force exerted by line 27 on the valve but the upper portion of the line will become taut and support the float in the space above the water level. It will be shown later that this valve is used solely for shutting off the incoming water and for shutting off the outgoing water. The vertical position of the float on the line within the well determines the level at which the incoming water will be shut off. This is more fully understood in connection with the detailed description of the valve. The ultimate water level is determined by the distance between valve 23 and the point at which float 22 is secured to line 27. Accordingly, the distance between points on valve 23 and float 22, together with the cross-sectional area of the brine tank 20, determines the volume of saline solution which will be transferred to the softener during a regeneration cycle. Owing to the presence of salt crystals, typically about one half of the volume thus indicated is salt solution.

Referring to Figure 2, valve 23 is shown in cross-sectional detail. The brine tank valve comprises a stationary housing 30, a movable stem and valve assembly 31, and a checking ball 32. The stem and valve assembly 31 may be made of one or more parts as desired and comprises a plunger 33 which has means at one end thereof such as hole 34 for attaching line 27 thereto. At the other end of plunger 33 there is a double-faced main valve 35 having grooves 36 and 37 accommodating and receiving compression O-rings 38 and 39 respectively. Main valve 35 may be integral with plunger 33 or may be made separately and attached thereto by any convenient means. Intermediate the ends of plunger 33 is a balance disc or balance piston 40 rigidly secured to plunger 33, and having an effective area slightly larger than main valve 35.

Housing 30 makes up all the rest of the valve, and may be constructed in one or more pieces as desired for convenience. The housing has a connection chamber 41 which is threaded at its upper end to receive brine tank pipe 17. Any other suitable or desirable joint may be used. At its lower end the connection chamber 41 has a check valve seat 42 which communicates with the lower main seat 43 also referred to herein as the brine flow seat. Check valve seat 42 is engaged by checking ball 32 whenever a positve pressure appears in the connection chamber 41, thereby restricting the flow of fluid to the lower main seat 43. When the pressure in connection chamber 41 is negative, namely when there is a partial vacuum (such as created by an aspirator), a stop 44, which may be of any desired configuration, limits the movement of checking ball 32 in an upward or downstream direction. Stop 44 also retains ball 32 against falling out during handling, servicing, etc. Check valve seat 42 has a notch or orifice 45 which effectively bypasses the check valve 32, 42. While this orifice has been shown as a notch it can be any communication between connection chamber 41 and lower main seat or brine flow seat 43 which bypasses the check valve 42, 42. When a positive domestic line pressure is present in the connection chamber 41, typically a flow of one-half gallon per minute will be passing through such orifice. This flow is used to refill the brine tank with fresh water in a manner explained later herein.

Above the lower main seat 43, the housing contains a main valve chamber 46 which is terminated at its upper end by the upper main seat 47, also referred to herein as the refill seat. Plunger 33 extends downwardly through upper main seat 47 into main valve chamber 46 and thus carries the double-faced main valve 35 within the chamber 46 in such a manner that O-ring 38 may engage with upper valve seat 47 and O-ring 39 may engage with lower main seat 43. A fluid passage 47a, here shown to be annular, is thus defined jointly by upper main seat 47 and the adjacent portion of plunger 33.

The housing 30 has a balancing chamber 48 which surrounds the balance disc or piston 40. The balancing chamber may be made by an extension of the cylindrical wall which defines the main valve chamber 46 and which has washers or spacers 49 and 50 defining the ends thereof. The plunger 33 extends through spacers 49 and 50. The clearance 50a between plunger 33 and spacer 50 is very slight while the clearance 49a between plunger 33 and spacer 49 may be somewhat larger. The fluid passage 47a communicates with a bypass 51 which in turn communicates with the upper end of balancing chamber 48. A brine tank port 52 permits flow between the lower end of the balancing chamber and the interior of brine valve well 21.

When a positive source pressure is transmitted by fresh water entering the valve through brine pipe 17 and into connection chamber 41, such pressure seats the checking ball 32 on the check valve seat 42, thus closing the check valve. Such source pressure also acts on the notch or orifice 45 and causes water to flow toward and to act around main valve 35, through the upper main valve seat 47, through bypass 51 and out through brine tank port 52. Additional fluid will flow from upper main seat 47 through the opening 49a in washer 49 and directly to brine tank port 52. The flow produces a dynamic pressure acting upwardly on the lower face of main valve 35. The static pressure acting on the lower surface of main valve 35 also acts on the upper surface of main valve 35, leaving an effective unbalanced area equal to that of the plunger 33, and also acting in a upward direction. These two forces tend to close the main valve. However, it can be seen that the water flows with least resistance, through the large openings 51a and 51b defining bypass 51 to reach brine tank port 52 and therefore a substantial portion of the flow acts on the upper surface of balancing disc 40 to produce a dynamic downward thrust on plunger 33. This downward force causes the valve to become balanced, both dynamically and statically in a position corresponding to the lower broken line view. Under this condition the balancing disc 40 may partially overlap the brine tank port 52. When the water has risingly reached a certain level determined by the effective length of line 27, the float 22 produces an upward force on the stem and valve assembly 31 and assist it upwardly across the previously described point of balance. Once balancing disc 40 reaches the upper end 51a of bypass 51, fluid coming through bypass 51 passes beneath balancing disc 40 and directly to brine tank port 52 whereupon the aforedescribed upward static and dynamic pressures act substantially unopposed upon the effective valve area to force the main valve closed at the upper valve seat 47, thereby cutting off the further admission of fresh water to the brine tank. The upper set of broken lines represent this condition. Thus the valve sensed a positive pressure at the connection chamber 41, moved off the seat to a point of equilibrium shown by the lower set of broken lines for refilling the tank, and then moved to a fully closed position, shown by the upper set of broken lines, substantially with a snap action when the reaching of the desired water level was indicated by the float.

Thus it is apparent that full water pressure may be applied to brine tank pipe 17 during the long softening cycle and that the valve shuts off the supply of water, and keeps it closed, using both the force from the float, as well as the static source water pressure itself, acting on what is now a rather large effective main valve area defined by approximately that of the O-ring opening. Thus the higher the pressure, the less the likelihood of leakage past the main valve seat.

When water is removed from the tank, as described below, it can be seen that the upper end of line 27 supports float 22 to prevent the fouling or tangling of line 27. However, there is sufficient slack in line 27 to permit the movement of the stem and valve assembly 31 to move to any position.

When there is a negative pressure or partial vacuum at connection chamber 41, produced by operation of the ejector or aspirator in the valve control, there is an apparent substantial positive pressure at brine tank port 52. This substantial pressure is equal to the sum of the head of brine plus the partial vacuum. This pressure or pressure difference is present at upper O-ring 38 and acts across the effective area of that ring. Such pressure produces a force which moves the stem and valve assembly 31 in a downward direction. It can be seen that this static pressure acts on both surfaces of the balance disc 40 which at this point has no effect. The net force acting on the effective area of main valve 35 causes the main valve to unseat from upper main seat 47 and to move in a downward direction. This movement is opposed by the force of the float 22. Once the flow of brine begins, it is apparent that liquid enters the brine tank port 52 and flows into balancing chamber 48. While some of this fluid flows through the opening 49a in washer 49, most of it flows in an upward direction dynamically impinging against the lower surface of balance disc 40 and then through bypass 51 to the upper main seat 47. When the fluid flows through main seat 47, it dynamically impinges against the upper surface of main valve 35, passes around it and out through the check valve 32, 42, raising the checking ball 32 off check valve seat 42 as shown in Figure 2, stop 44 preventing or limiting movement of checking ball 32, should it go that far. It is seen that the dynamic flow forces acting against balance disc 40 are largely offset by the dynamic forces acting against the main valve 35. Since the valve disc 40 has a slightly larger effective area, the vacuum cannot cause the main valve 35 to seat against the lower main seat 43. Thus a second condition of equilibrium is attained, shown by solid lines of Figure 2, even after the water level 25 has gone downward so that the upper portion of line 27 supports float 22. Under this set of conditions, the valve permits the aspiration of saline solution from the brine tank 20 into the softener 10. When the water level 25 has moved downward to the region of the brine tank valve 23, air is drawn in by the valve 23. This air can enter through the opening 50a in the washer 50 around the plunger 33 and also through the brine tank port 52. Once air enters balancing chamber 48, it flows both through the opening 49a in washer 49 and toward the balancing disc 40, through bypass 51, to the upper surface of the upper main seat 47. Since the air is of a somewhat lower mass than the brine solution, and since it flows more easily through the opening in washer 49 than does water, the dynamic or impingement force from the fluid against balance disc 40 is lost, and thereby the condition producing equilibrium is also removed. The partial vacuum then draws the main valve 35 into engagement with the lower main seat 43, thereby effectively shutting off the admission of both air and brine solution to the softener 10. It will be apparent that when air enters the opening 50a in washer 50 about plunger 33, it will impinge against the upper surface of balance disc 40. Since this is a relatively close fitting connection, not much water can get through there. However, air finds its way through the opening somewhat easier and therefore it aids in upsetting the equilibrium condition and initiating the downward travel of the stem and valve assembly 31. Since the negative pressure was produced by aspiration resulting from the flowing of fresh hard water through the ejector and the chemical bed, such hard water may be allowed to continue to flow to constitute the rinsing portion of the regeneration cycle. When the rinsing time has passed, the sequential timer of the automatic softener control changes the solenoid valve settings so that a positive pressure again appears at connection chamber 41, thereby instituting a repetition of the above-described cycle.

Thus it is apparent that when suction is present at the connection chamber 41, the suction opens the main valve, while a balancing disc 40 is responsive to the flow of brine through the valve to maintain the valve in substantially balanced unseated condition until the predetermined volume of brine has been withdrawn from the brine tank, whereupon the decrease of water level allows entrance of air into the valve unit to upset the balance, and the valve closes to shut off further flow of brine from the tank.

Referring to Figures 4 and 5, a modified form of brine tank valve is shown. It will be noted that to a large extent, this valve is quite similar to that of Figure 2, however certain elements being inverted with respect to the water level. This particular form of valve is constructed so that it senses low brine level closer to the bottom of the brine tank 20 than does the valve of Figure 2. It also has a feature which permits the shutting off of brine flow without the intake of any air into the water system, which, as is shown below, is an optional feature.

Basically the valve consists of a housing 60, a stem and valve assembly 61, a checking ball 62, interconnected buoyant balls 53 and 54, and upper and lower interconnected non-buoyant balls 55 and 56. In the manner shown in Figure 1, the valve of Figure 4 may be installed in place of brine tank valve 23 in the brine tank well 21. Brine tank pipe 17 is connected by any suitable means to the housing 60, and more specifically to a connection chamber 71. Float 22 is connected as before to the brine tank pipe 17 at a point 17' by a line 27', preferably made of plastic monofilament such as nylon. The lower end of the line 27' is connected to the upper non-buoyant ball 55. While the brine tank well 21 is not shown in Figure 4, it is intended that the valve be used with such a well so as to prevent fouling of the float 22 and the various balls 53—56.

The stem and valve assembly 61 comprises a plunger 63, a double-faced main valve 65, and a balance disc or balancing piston 70. The design of the stem and valve assembly 61 may in practice be broken down to as many or as few pieces as desired. Preferably, piston 70 has an effective area slightly larger than that of main valve 65.

The housing 60 makes up substantially all of the rest of the valve, except for the various balls. Accordingly, this housing may be composed of as many or as few parts as may be desired. In this form, as well as in the earlier form, the housing as well as the plunger 63, balance disc 70 and main valve 65, are made of a plastic material which is resistant to brine solution, and which has a specific gravity nearly identical to that of a saturated brine solution. When these are immersed in brine solution, it will thus be seen that there will be no chemical attack, and also that the valve and its components are essentially weightless with respect to the solution. Thus the effect of the mass of the different moving parts is negligible.

The housing 60 has a check valve seat 72 which coacts with checking ball 62 to form a check valve 62, 72. The checking ball 62 is carried within the connection chamber 71, and its upward movement therein is limited by stop 74, which is here illustrated as being a pin. The check valve seat 72 communicates with one of the main seats 73. In this modification the main seat 73 is the upper main seat and it corresponds to the lower main seat of the Figure 2 form. The upper seat 73 of Figure 4 and the lower seat 43 of Figure 2 and other equivalent seats are therefore collectively referred to as the brine flow seat since these seats block the outflow of brine. The upper main seat or brine flow seat 73 has an O-ring groove 67 in which is fitted a conventional compression O-ring 69. Adjacent to check valve seat 72, there is an orifice or notch 75 which communicates with the connection chamber 71 and with the brine flow seat 73, thereby bypassing check valve 62, 72 when it is closed.

The housing 60 further has walls defining a main valve chamber 76 which is closed at one end by the brine flow seat 73 and at the other end by the lower main seat 77. The lower main seat 77 of Figure 4 corresponds to the upper seat 47 of Figure 2 in that both serve to block the inflow of fresh water for refilling of the brine tank 21. Therefore, this type of seat is collectively referred to as the refill seat. The refill seat 77 has an O-ring groove 66 in which is positioned a conventional compression O-ring 68. Figures 2 and 4 together therefore show that the O-rings of these various forms of valves may be located either within the main valve or within the main valve seats. The double-faced main valve 65 is likewise located within the main valve chamber 76.

The housing 60 also has a balancing chamber 78 into which the plunger 63 projects and carries balance disc or balance piston 70. A washer or a spacer 79 having a central hole 79a defines one end of the balancing chamber 78, and is identical to washer 49 of Figure 2. The other end of balancing chamber 78 is closed by a spacer 80 which corresponds to spacer 50 of Figure 2. Spacer 80 may be provided with a small orifice analogous in size to the effective area of the opening 50a in spacer 50, or the orifice may be provided in the wall of the housing as shown at 80a. A bypass 81, identical to bypass 51, is connected to one extreme of the balancing chamber 78 at one end 81a, and at the other end 81b communicates with the lower surface of refill seat 77. The balancing chamber 78 also has two brine tank ports 82 and 83. It will be seen that brine tank port 83 and interconnected balls 53 and 54 together with that portion of the housing 60 in which they function may be omitted if admission of a slight amount of air to the softener and the water distribution system is not objectionable. Brine tank port 83 communicates with a trigger chamber 84. Trigger chamber 84 has an upwardly directed opening 85 through which extends a means 89 shown as a wire interconnecting buoyant balls 53 and 54. The brine tank port 82 extends from balancing chamber 78 to a second trigger chamber 86 which likewise has an upwardly directed opening 87 through which extends a means 90 shown as a wire interconnecting non-buoyant balls 55 and 56.

Except for the functioning of the two trigger chambers and their associated balls, it will be seen that the operation of this device is substantially identical to that of the device of Figure 2. While the valve as drawn represents its position during withdrawal of brine during a portion of the recharging or regenerating cycle, the refilling is first described. A positive pressure is presented from the softener controls via brine tank pipe 17 to the connection chamber 71. This pressure closes check valve 62, 72, but allows a small flow through orifice 75. It is shown later that this initiation occurred with the main valve 65 seated against the brine flow seat 73. Thus the incoming pressure reaches seat 73 via orifice 75 and causes it to unseat slightly, fluid flowing about the main valve 65 through the refill seat 77 primarily into the upper end 81b of bypass 81, thence directed at the lower face of balancing disc 70 and around it to the brine tank ports 82 and 83. Some fluid will pass from the refill seat 77 through the opening 79a in the spacer 79 directly to the brine tank ports 82 and 83. It is also shown later that the refill cycle began with the buoyant ball 53 resting against the opening 85. Thus water entering trigger chamber 84 causes the balls 53 and 54 to rise. It is clear that with a relatively small rise in water level, ball 54 will close off the opening 85 from the lower side. In the meantime, inflowing fresh water has also been flowing from the balancing chamber 78 outward through brine tank port 82 into trigger chamber 86. Since balls 55 and 56 are not buoyant, it is evident that ball 56 acts as a weight or sinker with respect to ball 55 and keeps it aligned with respect to the opening. However, the water pressure entering trigger chamber 86 through port 82 acts on the lower surface of ball 55 and raises it sufficiently to let the incoming fresh water fill the brine tank. The filling process continues until float 22 is raised which in turn via line 27', causes the lower ball 56 to engage the lower surface of opening 87 thereby closing off the primary path for fresh water. Of course some water will also be entering the brine tank via orifice 80a. When the primary flow has been stopped by ball 56, the dynamic force acting on the lower surface of balancing disc 70 terminates. This is the balancing force which has been preventing the main valve 65 from moving to a fully closed position with respect to the refill seat 77. Upon the termination of the flow of fresh water thus against balancing disc 70, the incoming fluid pressure acts on the main valve 65 forcing it sealingly against the refill seat 77 thus cutting off all further admission of fresh water to the brine tank. Thus, it has been shown that while the trigger chamber 84 served to admit a comparatively small amount of water at the beginning of the refill cycle, such admission of water was unnecessary. Hence, insofar as the refill cycle is concerned, the brine tank port 83 as well as the trigger chamber 84 and buoyant balls 53 and 54 perform no function necessary for operativeness. However, their utility will be apparent in the recharging cycle.

The recharging cycle begins with the main valve in the lowermost position and each of the balls 53—56 in their upward position, the high level of brine solution serving to keep them there, either of their own buoyancy in the case of balls 53 and 54, or by action of the float 22. When a negative pressure or a partial vacuum is applied to the brine tank pipe 17 and thus to the connection chamber 71, the check valve 62, 72 is unseated thereby permitting the free flow of brine to the brine tank pipe 17, and in an upward direction. It will be seen that when the flow is quite substantial, the ball 62 may either be suspended, or will be restricted from moving up into the pipe 17 by pin 74. The suction or negative pressure thus appears in the main valve chamber 76 and causes the unseating of the main valve 65 from the refill seat 77. The relatively higher pressure on the outside of the valve causes brine solution to depress or unseat buoyant ball 54 thereby admitting brine to the trigger chamber 84. Brine solution also initially enters via orifice 80a and thus passes from both the trigger chamber 84 and orifice 80a to the balancing chamber 78. The comparatively higher outside pressure also acts on the upper surface of non-buoyant ball 56 and thereby admits brine solution via trigger chamber 86 and brine tank port 82 into the balancing chamber 78. While the negative pressure is acting on the main valve 65 to raise it, it will be seen that the majority of the inflowing brine is entering the mixing chamber through brine tank ports 82 and/or 83 and thus flowing primarily toward the lower opening 81a of bypass 81, thereby producing a dynamic balancing force against the upper surface of balance disc 70. This will again cause the stem and valve assembly 61 to move to a position of equilibrium, substantially as drawn, thereby permitting the uninterrupted flow of brine solution from the brine tank to pipe 17.

It will be noted that after the water level 25 has moved from its full position 25a in Figure 4 to that shown as a solid line, the upper non-buoyant ball 55 will close off further admission of brine to trigger chamber 86. However, the capacity of brine tank port 83 is sufficient to maintain the hydrostatically balanced condition above described. When the brine level 25 goes downward further and reaches buoyant ball 53, balls 53 and 54, being interconnected by a stiff member 89 such as a wire, will move downwardly together until ball 53 closes opening 85. The closure of opening 85 by ball 53 occurs without any significant admission of air through opening 85. Most important, the flow through brine tank port 83 to the balancing chamber 78 will thereby be terminated. This termination of flow removes the dynamic force acting against the upper surface of balance disc 70 thereby permitting the flow of saline solution through orifice 80a to be the sole effective source. Since this solution will flow to the bypass opening at the bottom 81a of bypass 81 without acting on the balance disc 70, the partial vacuum in brine tank pipe 17 will cause the main valve 65 to seat against the brine flow seat 73, thus cutting off flow of brine solution to the water softener.

It may be added that once openings 87 and 85 have been closed, any brine which enters port 80a and which passes through the opening 79a in spacer 79, will of necessity act against the lower surface of balance disc 70 and thus aid or assist the suction in closing main valve 65 against brine flow seat 73. Likewise, during the refill cycle, when balls 54 and 56 have closed holes 85 and 87 respectively, all the water entering the valve through orifice 75 must flow past both the valve 65 and the balance disc 70 in the same direction in order to leave the valve at orifice 80a, thus cooperating to force the main valve 65 to seat against the refill seat 77.

Thus it has been shown that this structure will also function to control a volume of brine that will be drawn into the water softener during regeneration. This structure thus also has a balancing disc on the valve stem which is responsive to the flow of brine through the valve unit to maintain the valve in substantially hydrostatically balanced unseated condition until the predetermined volume of brine has been withdrawn from the brine tank, whereupon the interruption of inflowing brine upsets the balance and the valve closes to shut off further flow of brine from the tank. This structure also causes fresh water to flow into the valve during the service cycle of the water softener and includes a mechanism which causes the valve to shut off the fresh water when the proper volume has entered the brine tank.

It will be seen that if brine tank opening 83 were omitted as well as the trigger mechanism contained in trigger chamber 84, the valve would be operative. With such a structure, the aforesaid closing of opening 87 by non-buoyant ball 55 would constitute the triggering which would in turn remove the unbalancing force from the upper surface of balancing disc 70 and thus permit the partial vacuum to cause the engagement of main valve 65 against the brine flow seat 73. With such a structure, the length of the interconnecting means 90 between non-buoyant balls 55 and 56 as well as the length of the trigger chamber 86 would determine the level to which the brine would be permitted to decrease per regeneration cycle of the water softener. Thus brine tank port 83 and trigger chamber 84 may be said to be an optional feature.

Apart from balls 53—56 and the O-rings, the valve may be constructed of a material having a specific gravity approximately equal to that of a brine solution. It has been found that unplasticized polyvinyl chloride, "Kralastic," or any other material that is resistant to a saline solution and hence to corrosion may be utilized in the structure of the valve.

Referring to Figures 6, 7 and 8, another modified form illustrating the use of the same fundamental principles in the construction of the valve is presented. This valve may also be installed in brine well 21, while brine tank pipe 17 may be connected to connection chamber 141. This connection may be by the threads as illustrated or by any other convenient means. The valve as a whole includes a housing 130, a stem and valve assembly 131 and a checking ball 132. The stem and valve assembly 131 comprises a plunger 133, having at one end a fastening means 134 here illustrated as being a hole to which the lower end of line 27 may be attached. At the opposite end of plunger 133, there is carried a double-faced main valve 135. In this form, the plunger 133 is made from hollow plastic tubing, and the double-faced valve 135 closes one end of such tubing. Intermediate the ends of the plunger 133 is a balance disc or balance piston 140 which is secured to plunger 133 and which has a diameter slightly larger than the major diameter of the main valve 135. Plunger 133 also has a bypass 151 which is formed by the hollow of the tube from which plunger 133 is made and which terminates in or includes upper and lower openings 151a and 151b respectively. The upper end of the bypass 151 is sealed from the rest of the plunger by a plug 188. A plug 188', similar to 188, may also be used adjacent the fastening means 134 to further seal the upper end of the plunger if desired. Of course the stem and valve assembly 131 may be made from one or more pieces so long as an equivalent structure is attained. For example, by making 133 from solid material and boring out the lower end, it is possible to omit plugs 188 and 188'. In any event, the stem and valve assembly 131 comprises the plunger 133, the balance disc 140, the main double-faced valve 135 and the bypass 151.

The housing 130, except for the O-rings 138, 139 and ball 132, makes up all of the remainder of the valve. Likewise it too may be constructed from one or more pieces as desired. The brine tank pipe 17 is secured to connection chamber 141 which contains the checking ball 132. The checking ball is prevented from moving outward into pipe 17 by a stop 144. The housing 130 has a check valve seat 142 communicating with the lower main seat or brine flow seat 143. Connection chamber 141 also has an orifice or notch 145 which bypasses the check valve 142, 132. The housing 130 also contains a main valve chamber 146 which is terminated at one end by the brine flow seat 143 and at the other end by the upper main seat or refill seat 147. The brine flow seat 143 has an O-ring groove 137 in which is positioned a conventional compression O-ring 139. It is clear that the main valve may engage the O-ring 139 in seat 143 when the main valve is in its lowermost position, thus forming an effective seal. The upper main seat or refill seat 147 also has an O-ring groove 136 in which is contained a second conventional O-ring 138.

The housing 130 also contains a balancing chamber 148 which is defined at one end by a spacer 149 which is here shown to be made integral with the refill seat 147. The opposite end of the balancing chamber 148 is defined by a second washer or spacer 150 which has a hole which provides a relatively small annular opening 150a surrounding the plunger 133. The balancing chamber 148 is also provided with two brine tank ports 152, 152, one of which suffices if it is of adequate size. It is preferable, however, to use two such openings because, as will be seen in connection with the description of operation of this device, a more balanced distribution of forces on the balance disc 140 occurs if two brine tank ports are used.

This form of valve operates in a manner similar to that in which the other forms described above operate.

Referring to Figure 7, when a positive pressure appears at the pipe 17 from the fresh water supply, the checking ball 132 engages seat 142 to close check valve 132, 142. However, orifice 145 permits the bleeding of fresh water from the connection chamber 141 into the lower surface of the lower main seat or brine flow seat 143. As is shown later herein, the refill cycle begins with the main valve 135 in a downward position engaging the lower main seat or brine flow seat 143. The fresh water thus admitted by orifice 145 appears at the lower surface of main valve 135 at substantially line pressure to cause the unseating thereof. This pressure will force the main valve 135 towards the opposite main seat, namely the refill seat 147. A portion of the fluid moves along the outside of stem or plunger 133, through annular opening 149a, and out through brine tank ports 152, 152 in the balancing chamber 148. However, a substantial portion of the fluid enters the opening 151b of the bypass 151, leaving bypass 151 at opening 151a, thereby entering the balancing chamber 148 at the upper surface of the balance disc or piston 140. While a small amount of water may leak out past the stem at opening 150a, the majority of it will flow in a downward direction, dynamically impinging against the upper surface of balance disc 140, flowing about it and thence out through the two brine tank ports 152, 152. The water which is passed through the bypass 151 which flows out the brine tank ports 152, 152 exerts a downward force against the upper side of the balancing disc 140 which force is opposite in direction to that produced by the line pressure acting on the main valve 135. Accordingly, when the valve stem assembly 131 moves to a position where these two forces neutralize each other, a position of equilibrium is reached which is illustrated in Figure 7. This condition will continue until the float 22 connected to line 27 (Figure 1) is raised, thereby causing the stem and plunger assembly 131 to be raised and carried across the point of equilibrium, the required energy being applied by the float 22. When the main valve 135 is thus brought in contact with the O-ring 138, the flow of water past O-ring 138 ceases, and hence the water flow through the bypass 151 also terminates. This causes a termination of the balancing force on the upper surface of the balancing disc 140 whereupon the line pressure at brine tank pipe 17 acts on the lower surface of the main valve 135, which at that point has an effective area equal approximately to that of the O-ring opening. Thus, a positive seal is produced and maintained by the water supply line pressure, thereby preventing any further filling of the tank.

When a negative pressure is applied to brine tank pipe 17, such negative pressure or partial vacuum will tend to draw checking ball 132, which has likely fallen to the bottom of connection chamber 141, toward the pipe 17. The stop 144 prevents the ball from entering or closing the pipe 17 as shown in Figure 6. The main valve 135, up to this point engaged against the upper main valve seat 147, has a much higher pressure on its upper side than on its lower side and accordingly is drawn away from the upper main seat or refill seat 147. The partial vacuum attempts to draw the main valve 135 all the way down against the lower main valve seat 143. However, brine solution is entering brine tank ports 152, 152 and while some brine will flow downward along the stem through opening 149a, a substantial portion of it will travel upwardly and impinge against the lower surface of balancing disc 140, pass about it and thence into the opening 151a of the bypass 151, downward through bypass 151 and outward through opening 151b and thence around the main valve 135 and through the opening in the lower or brine flow seat 143, through the opening at seat 142 and thence into the brine tank pipe 17. While the suction tends to cause the main valve 135 to be drawn in a downward direction, the dynamic force caused by the upward flow of water against the lower surface of balancing disc 140 is, of course, in the opposite direction and hence a point of equilibrium is reached. This point is illustrated in the drawing of Figure 6. By use of a pair of orifices 152, 152 positioned generally opposite to each other within housing 130, a more uniformly distributed upward force against disc 140 is obtained, thereby minimizing any binding between plunger 133 and spacers or washers 149, 150. Thus a hydrostatic dynamic balance is achieved which continues until something occurs to disrupt it. When the water level in the brine tank has decreased to a level corresponding to the top of the housing 130 and defined by the top spacer or washer 150, air is drawn in about the plunger 133 through the annular opening 150a defined by the plunger 133 and the spacer 150 and passes into the opening 151a of the bypass 151. The inrushing air will reduce the mass rate of flow (of water) through hole 151a and therefore also reduce the upward dynamic force against the lower surface of the balancing disc 140. Under this condition, there is air flow in a downward direction through opening 150a which impinges against the upper surface of balancing disc 140. Also, all flow through the bypass 151 is in a downward direction. The upward balancing force being reduced or effectively removed, the condition of equilibrium is lost and the main valve 135 closes against the lower main seat or brine seat 143.

Thus, again a further structure has been presented which closes as a function of the brine level and hence the volume of brine which has been drawn into the water softener during regeneration. The structure includes a balancing disc on the valve stem or plunger which is responsive to the flow of fluid through the valve unit to maintain the valve in a substantially hydrostatically balanced unseated condition until the predetermined volume of brine is withdrawn from the brine tank whereupon leakage of air into the valve upsets the balance and the valve closes to shut off further flow of brine from the tank. It will be noted that essentially this same operation takes place in reverse whereby a recharge of fresh water flows through the valve into the brine tank, the valve shutting off the supply of fresh water when the proper volume has entered the brine tank.

Figures 9 and 10 show a still further modification of the instant valve. This valve combines features of the valves shown in Figures 2, 4 and 6 and is mounted as they are at the bottom of the brine tank well 21 being supported by the pipe 17. Of course, this valve has other features not shown in the other modifications presented.

Referring to Figure 9, the valve is shown in cross-sectional detail. The brine tank valve comprises a stationary housing 160, a movable stem and valve assembly 161, a checking ball 162, line 27', buoyant ball 153, and non-buoyant ball 156. The stem and valve assembly 161 may be made of one or more parts as desired and comprises a plunger 163 at the lower end of which is a double-faced main valve 165 having grooves 166 and 167 accommodating and receiving compression O-rings 168 and 169 respectively. Main valve 165 may be made integral with plunger 163 or may be made separately and attached thereto by any convenient means. Intermediate the ends of plunger 163 is a balance disc or balance piston 170 rigidly secured to plunger 163, and having an effective area slightly larger than main valve 165. A shoulder or step 163' may be provided in stem 163, if desired, to assist in the manufacturing location of the disc 170.

Housing 160 makes up all of the rest of the stationary parts of the valve, and may be constructed in one or more pieces as desired for convenience. The housing has a connection chamber 171 which has a threaded opening which receives brine tank pipe 17. Any other suitable desired joint may be used. At its upper end, the connection chamber 171 has a check valve seat 172 which communicates with the lower main seat or brine flow seat 173. Check valve seat 172 is engaged by checking ball 162 whenever a positive pressure appears in the connection chamber 171, thereby restricting the flow of fluid to the lower main seat or brine flow seat 173. When the pressure in connection chamber 171 is negative, namely when there is a partial vacuum such as created by an aspirator, a stop 174, which may be of any desired configuration, limits the movement of checking ball 162 in a downward or downstream direction. Stop 174 also retains the ball 162 against falling out during handling, servicing, and the like. In the instant figure, stop 174 is illustrated as being a plastic member with the length exceeding the diameter of the connection chamber, and being wedged endwise therein. Of course, as stated above, any configuration of stop may be used, either integral or removable. Check valve seat 172 has a notch or orifice 175 which effectively bypasses the check valve 162, 172. While this orifice has been shown as a small diameter hole, it can be any communication, between connection chamber 171 and the lower main seat or brine flow seat 173, which bypasses the check valve 162, 172. When a domestic line pressure is present in the connection chamber 171, water at a typical flow-rate of one-half gallon per minute will be passing through such orifice. This flow is used to refill the brine tank with fresh water in a manner explained later herein.

Above the lower main seat or brine flow seat 173, the housing contains a main valve chamber 176, the upper end of which is defined by the upper main seat or refill seat 177. The plunger 163 extends downwardly through the upper main seat or refill seat 177 into the main valve chamber 176 and thus carries the double-faced main valve 165 within the chamber 176 in such a manner that O-ring 168 may engage with the upper valve seat 177 and O-ring 169 may engage with the lower main seat or brine flow seat 173.

The housing 160 has a balancing chamber 178 which surrounds the balance disc or piston 170. The balancing chamber may be made by an extension of the cylindrical wall which defines the main valve chamber 176, and has washers or spacers 179 and 180 defining the ends thereof. Washer 179 is carried at the end of balancing chamber 178 adjacent to the upper main seat or refill seat 177. A fluid passage 179a, here shown to be annular, is thus defined jointly by the washer 179 and the adjacent portion of plunger 163. The clearance 180a between the plunger 163 and spacer 180 is not close, while the clearance between plunger 163 and spacer 179, here indicated by annular opening 179a, may be relatively smaller. Main seat 177 communicates with the lower end 181b of bypass 181 which in turn communicates at opening 181a with the upper end of balancing chamber 178.

A brine tank port 182 permits flow between the lower end of the balancing chamber 178 and the interior of trigger chamber 184. Trigger chamber 184 has an upwardly directed opening 185 located adjacent to the housing. Within chamber 184, there is a non-buoyant ball 156 which may be secured to the lower end of line 27'. Just as shown in Figure 1, line 27' is attached to float 22' intermediate its length, while the upper end of line 27' is secured to brine tank pipe 17. Thus the line 27' will move upwardly or downwardly with the surface of the water 25, subject to the restraint on the upper portion of line 27'. Buoyant ball 153 is slidably carried by line 27'. Thus the lower end of line 27' is a means between balls 153 and 156 extending through the opening 185. Since ball 153 is buoyant and is guided by line 27', it follows the falling surface 25 downward to close the opening 185 from above, and it follows the rising surface 25 upward until it engages float 22' as shown.

When positive source pressure is transmitted by fresh water entering the valve through brine pipe 17 and into connection chamber 171, such pressure positions the checking ball 162 on the check valve seat 172, thus closing the check valve. Such source pressure also acts on the notch or orifice 175 and causes water to flow toward and around the main valve 165 through the upper main valve seat or refill seat 177, into chamber 178 and through opening 181b into bypass 181, through opening 181a to the upper portion of connection chamber 178, out through brine tank port 182 into trigger chamber 184, and out through opening 185, raising ball 153 at the initiation of such flow. Additional fluid flows from the upper main seat 177 through the opening 179a and directly to brine tank port 182. The flow produces a dynamic pressure acting upwardly on the lower face of the main valve 165. The static pressure acting on the lower surface of main valve 165 is largely offset by its also acting on the upper surface of main valve 165. But there is an effective unbalanced area equal to that of the plunger 163, against which static pressure may act in an upward direction. These two forces tend to close the main valve 165 upwardly. However, it can be seen that the water flows with least resistance through the large openings 181a and 181b defining ends of passage 181 to reach brine tank port 182; therefore a substantial portion of the flow acts on the upper surface of balance disc 170 to produce a dynamic downward force on plunger 163. This downward force causes the valve to become hydraulically balanced, both dynamically and statically in a position of equilibrium. Under this condition, the balance disc 170 may partially overlap the brine tank port 182. When the water has risingly reached a certain level determined by the length of line 27' between float 22' and non-buoyant ball 156, the float 22' produces an upward force on the non-buoyant ball 156 and raises it to the lower surface of opening 185 to shut off the flow of water. Once the flow has terminated, the dynamic balancing force acting on the balance disc 170 also ceases and line supply pressure, acting on the effective area of main valve 165, raises the main valve and the stem to the fully upward closed position. Thus the attainment of the desired rising water level is utilized to cut off the further admission of fresh water to the brine tank. Thus the valve senses a positive pressure at the connection chamber 171, moves off the seat to a point of equilibrium for refilling the tank, and then moves to a closed position when the reaching of the desired water level is indicated by the float.

Thus line water pressure may be applied to the brine tank pipe 17 during the long softening cycle since the valve shuts off the water supply. It also keeps it closed using the static source water pressure acting on the rather large effective main valve area defined approximately by that of the O-ring diameter to keep the valve closed. Thus the higher the pressure, the less is the likelihood of leakage past the main valve seat.

When there is a negative pressure or partial vacuum at connection chamber 171, produced by operation of the ejector or aspirator in the valve control, there is an apparent substantial positive pressure at the opening 185 of trigger chamber 184 and at the opening 180a of the spacer 180. This pressure is equal to the sum of the head of brine plus the partial vacuum. This pressure or pressure difference is present at the upper O-ring 168 and acts on the effective diameter of that ring. Such pressure produces a force which moves the stem and valve assembly 161 in a downward direction. It can be seen that this static pressure acts on both surfaces of the balance disc 170 which at this point has no effect. The net force acting on the effective area of main valve 165 causes the main valve to unseat from the upper main seat 177 and to move in a downward direction. As soon as this movement begins, a flow of brine begins. Once the flow of brine begins, it is apparent that liquid enters the opening 185, then flows to brine tank port 182, and flows into balancing chamber 184. While some of this fluid flows through the opening 179a in the washer or spacer 179, most of it flows in an upward direction dynamically impinging against the lower surface of balance disc 170 and then through bypass 181 to the upper main seat 177. This is the path of least resistance. When the fluid flows through main seat 177, namely the refill seat, it dynamically impinges against the upper surface of main valve 165, passes around it and out through the check valve 162, 172, holding the checking ball 162 off check valve seat 172, against stop 174 as shown in Figure 9. Stop 174 limits the movement of checking ball 162 so that it does not block or enter pipe 17. It is seen that the dynamic flow forces acting against balance disc 170 are largely offset by the dynamic forces acting against the main valve 165. Since the valve disc 170 has a slightly larger effective area, the vacuum cannot cause the main valve 165 to seat against the lower main seat or brine flow seat 173. Thus, a second condition of equilibrium is attained, illustrated by the position of the parts in Figure 9, even after the water level 25 has gone downward sufficiently for the upper end of line 27' to support the float 22'. Under this set of conditions, the valve permits the aspiration of saline solution from the brine tank 20 into the softener 10. When the water level 25 has moved downward to a point where buoyant ball 153 engages the upper side of opening 185, the flow will be substantially blocked. Of course a small amount of fluid may still enter through opening 180a, but the continued application of vacuum to pipe 17 without the balancing force acting on disc 170 causes the stem and valve assembly 161 to move to a fully downward sealing position, thereby stopping further aspiration of brine solution. It is noted that no air is drawn into the system during this sequence of operational events.

Thus, with the removal of the dynamic balancing force of the water, which water was entering the balancing chamber 178 from brine tank port 182, the stem and valve assembly 161 is free to move downward without opposition from any balancing force. Of course, the negative pressure may be continuously applied to the valve during the continued flow of fresh water through the softener for rinsing purposes, without the drawing in of additional brine solution during the remainder of the regeneration cycle period. When the rinsing time has passed, the conventional timer of the automatic softener control changes the solenoid valve settings so that a positive pressure again appears at connection chamber 171, thereby instituting a repetition of the above described cycle.

Thus it is apparent that when suction is present at the connection chamber 171, the suction opens the main valve to initiate flow, and the balancing disc 170 is responsive to such flow of brine through the valve to maintain the valve in substantially balanced seated condition until the predetermined volume of brine has been withdrawn from the brine tank, whereupon the decrease of water level initiates the upset of the balance, and the valve then closes to shut off further flow of brine from the tank.

Referring to Figures 11 and 12, a still further modification of the valve is presented. It will be noted that this form combines the features of the Figure 4 structure together with an inversion of the Figure 9 structure, plus other features.

The Figure 12 structure shows the valve in cross section, with certain parts in elevation. The valve comprises a stationary housing 230, a movable stem and valve assembly 231, and a checking ball 232. The stem and valve assembly 231 may be made of one or more parts as desired and comprises a plunger 233 which has a double-faced main valve 235 having grooves 236 and 237 accommodating and receiving O-rings 238 and 239 respectively. Main valve 235 may be integral with plunger 233 or may be separately made and attached thereto by any convenient means. If desired, a shoulder 233' may be provided on plunger 233 as shown, to support a balance disc or balance piston 240 which is rigidly secured to plunger 233, and which has an effective area slightly larger than the main valve 235.

Housing 230 makes up the remainder of the valve, except for the upper buoyant ball 253 and the lower non-buoyant ball 256. The housing 230 may be constructed in one or more pieces as desired for convenience. The housing 230 has a connection chamber 241 which may be threaded at its upper end to receive brine tank pipe 17. Any other suitable or desirable joint may be used. At its lower end, the connection chamber 241 has a check valve seat 242 which communicates with the upper main seat 243, also referred to herein as the brine flow seat. Check valve seat 242 is engaged by checking ball 232 whenever a positive pressure appears in the connection chamber 241, thereby restricting the flow of fluid to the upper main seat 243 or brine flow seat. When the pressure in connection chamber 241 is negative, namely when there is a partial vacuum such as created by an aspirator, a stop 244, which may be of any desired configuration, limits the movement of check ball 232 in an upward or downstream direction. Stop 244 also retains ball 232 against falling or during handling, servicing, and the like. In the disclosed form, stop 244 comprises a plastic member having a length in excess of the diameter of the hole and forced endwise into the bore or hole of the connection chamber 241 as shown. The check valve seat 242 has a notch or orifice 245 which effectively bypasses the check valve 232, 242. While this orifice has been shown as a hole, it can be any communication between connection chamber 241 and the brine flow seat 243 which bypasses the check valve 232, 242. When a positive domestic water supply line pressure is present in the connection chamber 241, typically water at a flow rate of one-half gallon per minute passes through such orifice. This flow is used to refill the brine tank with fresh water in a manner explained below.

Below the upper main seat 243 or brine flow seat, the housing contains a main valve chamber 246 which is terminated at its lower end by the lower main seat 247 also referred to herein as the refill seat. Plunger 233 extends upwardly from the bottom of the valve through the lower main seat 247 into the main valve chamber 246 and thus carries the double-faced main valve 235 within the chamber 246 in such a manner that O-ring 238 may engage with lower main seat or refill seat 247 and O-ring 239 and may engage with upper main seat or brine flow seat 243. A fluid passage 247a, here shown to be generally annular, is thus defined jointly by the lower main seat 247 and the adjacent portion of plunger 233.

The housing 230 has a balancing chamber 248 which surrounds the balance disc or piston 240. The balancing chamber may be made by a downward extension of the cylindrical wall which defines the main valve chamber 246 and which has washers or spacers 249 and 250 defining the ends thereof.

Plunger 233 extends through the spacers 249 and 250. The clearance 250a between plunger 233 and spacer 250 is more than nominal so that sand particles may not imbed and cause binding between plunger 233 and washer 250, while the clearance 249a between plunger 233 and spacer 249 may be smaller, but of sufficient size to prevent binding. The fluid passage 247a communicates with a bypass 251 which in turn communicates with the lower end of balancing chamber 248. A brine tank port 252 permits flow between the upper end of the balancing chamber and the trigger chamber 284. Bypass 251 is defined at its upper end by an opening 251b and at its lower end by an opening 251a. Non-buoyant ball 256 is located within trigger chamber 284 and is supported by line 27' which extends from ball 256 through an upwardly directed opening 285 at the upper part of trigger chamber 284. Line 27' extends upwardly through buoyant ball 253 which is carried loosely thereon. Line 27' extends upwardly further through an opening 91 in an overhanging ear 92. Line 27' thus extends upwardly and is secured to any convenient portion on pipe 17 as shown in Figure 1. Float 22' is secured to line 27'. The distance between float 22' and non-buoyant ball 256 determines the height to which water will be permitted to rise in filling the brine tank. The height of the upper surface of opening 285 determines the level to which brine will be allowed to decrease during brine removal for regeneration purposes. Since ear 92 is stationary, it may be made as an integral part of the housing 230 or as an auxiliary piece. Ear 92 serves to define an upward limit of travel for ball 253, thereby further insuring against possible fouling of ball 253 as it is floated upwardly and downwardly with respect to line 27' by the changing water level.

When a positive source pressure is transmitted by fresh water entering the valve through brine pipe 17 and into connection chamber 241, such pressure tightly seats the checking ball 232 on the check valve seat 242, thus closing the check valve. Such source pressure also acts on the orifice 245 and causes water to flow toward and around main valve 235 through the lower main valve seat or refill seat 247, primarily through opening 251b, bypass 251, opening 251a, thence around the balance disc 240, through brine tank port 252, through the interior of trigger chamber 284, and out through opening 285. This flow raises ball 253, assuming that it was resting against the upper surface of opening 285. A small amount of additional fluid flows from lower main seat 247 through the opening 249a in the washer 249 and direct to the brine tank port 252. The main flow produces a dynamic pressure acting downwardly on the upper face of main valve 235. The static pressure acting on the upper surface of main valve 235 also acts on the lower surface of main valve 235, leaving an effective area equal to that of the plunger 233, and against which static pressure also acts in a downward direction. These two forces tend to close the main valve 235. However, it can be seen that the water flows with least resistance through the large openings 251a and 251b defining the ends of bypass 251 to reach the brine tank port 252 and therefore a substantial portion of the flow acts on the lower surface of balancing disc 240 to produce a dynamic upward thrust on plunger 233. This upward force causes the valve to become hydraulically balanced, both dynamically and statically, in a position of equilibrium. Under this condition the balancing disc 240 may partially overlap the brine tank port 252. When the water has risingly reached a certain level determined by the effective length of line 27', the float 22' produces an upward force on the non-buoyant ball 256 and raises it upwardly until it engages the lower face or edge of opening 285. Once the opening 285 is closed, the flow through the opening terminates. Termination of this flow also removes the hydrodynamic balancing force from the lower surface of balancing disc 240, whereupon the forces acting on the upper face of main valve 235 cause main valve 235 to move to a fully downward position against the lower or refill seat 247. Thus the aforedescribed downward static and dynamic pressures act substantially unopposed on the effective valve area to force the main valve closed at the lower valve seat 247, thereby cutting off the further admission of fresh water to the brine tank. Thus the valve senses a positive pressure at the connection chamber 241, moves off the seat to a point of equilibrium for refilling the tank, and then moves to a fully closed position when the reaching of the desired water level is indicated by the float.

Thus it is apparent that full line water pressure may be applied to the brine tank pipe 17 during the long softening cycle and that the valve closes off the supply of water, and keeps it closed, using the static source water pressure acting on what is now a rather a large effective main valve area, defined by approximately that of the O-ring opening, to keep the valve closed. Thus the higher the line pressure, the less the likelihood of leakage past the main valve seat, within the strength limits of the valve.

When there is a negative pressure or partial vacuum in connection chamber 241 produced by operation of the ejector or aspirator in the valve control, there is an apparent substantial positive pressure at brine tank port 252. This substantial pressure is equal to the sum of the head of brine plus the partial vacuum. This pressure or pressure difference is present at the lower O-ring 238 and acts across the effective area of that ring. Such pressure produces a force which moves the stem and valve assembly 231 in an upward direction. It can be seen that this static pressure acts on both surfaces of the balance disc 240 which at this point has no effect. The net force acting on the effective area of the main valve 235 causes the main valve to unseat from the lower main seat 247 or refill seat and to move in an upward direction. Once the flow of brine begins, it is apparent that liquid enters the opening 285 displacing the non-buoyant ball 256 downward, thence flows through brine tank port 252 and flows into balancing chamber 248. While some of this fluid flows through the opening 249a in the washer 249, most of it flows in a downward direction dynamically impinging against the upper surface of balance disc 240 and then through bypass 251 to the lower main seat 247. When the fluid flows through the lower main seat or refill seat 247, it dynamically impinges against the lower surface of main valve 235, passes around it and out through the check valve 232, 242, raising the checking ball 232 off check valve seat 242 as shown in Figure 12, stop 244 preventing or limiting movement of checking ball 242 should it go that far. It is seen that the dynamic flow forces acting against balance disc 240 are largely offset by the dynamic forces acting against main valve 235. Since the valve disc 240 has a slightly larger effective area, the vacuum cannot cause the main valve 235 to seat against the upper main seat 243. Thus a second condition of equilibrium is obtained. Under this set of conditions, the valve permits the aspiration of saline solution from the brine tank 20 into the softener 10. When the water level 25 has moved downward to the region of the opening 285, buoyant ball 253 engages the upper surface of opening 285 thereby cutting off further inflow of brine solution to trigger chamber 284. Once the flow has been terminated, the dynamic or impingement force of the fluid against balance disc 240 is lost and thereby the condition producing equilibrium is also removed. The partial vacuum then draws the main valve 235 into engagement with the upper main seat 243, thereby effectively shutting off the admission of brine solution to the softener 10. It will be apparent that no air enters the valve during the foregoing operation. Since the negative pressure was produced by aspiration resulting from the flowing of fresh hard water through the ejector and the chemical bed, such hard water may be allowed to continue to flow to constitute the rinsing portion of the regeneration cycle. When the regeneration time has passed, the sequential timer of the automatic softener or control changes the solenoid valve setting so that a positive pressure again appears in connection chamber 241, thereby instituting a repetition of the above described cycle.

Thus it is apparent that when suction is present in connection chamber 241, the suction opens the main valve while the balance disc 240 is responsive to the flow of brine through the valve to maintain the valve in substantially balanced unseated condition until the predetermined volume of brine has been withdrawn from the brine tank, whereupon the decrease of water level upsets the balance and the valve closes to shut off further flow of brine from the tank.

The material for the stem and valve assembly 231, as stated above, is plastic. Ideally, the material should be selected for its specific gravity.

It is recognized that the specific gravity of water is not the same as the specific gravity of brine solution. It is stated earlier herein, that if material is selected which has a specific gravity substantially the same as that of the liquid, the stem and valve assembly will be essentially without weight, that is, being neither buoyant or non-buoyant. I have found that the ideal specific gravity for the various stem and plunger assemblies, such as 231, is a specific gravity which is intermediate that of water and of saturated brine solution. Thus the stem and plunger assembly is caused to ride within the valve housing at a position which is slightly higher when the brine solution is present than it does within the valve when fresh water is present. This effect can be used to advantage when selecting the specific dimensions utilized in the valve. This feature in itself is not critical for operativeness, but it does promote reliability of operation.

Thus it is the specific gravity of the stem and plunger assembly as a whole which is to be considered. The desired specific gravity may be obtained by using any one or more methods such as (1) selection of a suitable material, (2) providing a hollow sealed portion within the stem, such as is shown in Figure 6, to decrease the specific gravity, and (3) providing a slug 93 of more dense material, such as lead, to form a part of the stem, as is shown in Figure 12, to increase the specific gravity. When a stem and plunger assembly is used which has a specific gravity medially that of water and saturated brine solution, wide manufacturing tolerances can be accommodated without sacrifice of operational reliability.

The term "ball" as used herein is intended to encompass both a spherical configuration and any other shape which will produce an equivalent result within the valves disclosed herein.

It is also apparent that it is possible to interchange the location of the brine tank pipe 17 from being adjacent to what has been termed herein as the connection chamber to being adjacent to the opening which leads to the brine tank well. If such a change were made, the valve would be fully operative though not necessarily so in a system such as disclosed in Figure 1.

It is also apparent that the connection between pipe 17 and the valve may be made directly at the opening to the brine flow seat 43, 73, 143, 173 or 243. This is feasible whenever the fresh water supply pressure is so low that the function of a check valve to limit the inlet flow rate is not required, or if some auxiliary means external to the valve be utilized to so limit the flow rate. Restated, the check valve and orifice may be omitted where external pressure conditions permit doing so.

It is also apparent that since each of the valves disclosed in this specification is usable for two directions of flow, essential elements may be utilized to obtain valves using the principles of my invention wherein only one direction of flow is controlled, where desired.

It will be understood that numerous further modifications may be effected without departing from the scope of the novel concepts of the present invention.

I claim as my invention:

1. A valve device comprising in combination, a housing having a connection chamber, a balancing chamber, and a main valve chamber intermediate said connection and balancing chambers; said housing having an opening communicating with said connection chamber for attachment of a fluid conduit thereto; said main valve chamber having a pair of apertured main seats defining ends thereof and communicating with said connection and balancing chambers; a stem movable with respect to said housing; a double-faced main valve in said chamber at one end of said stem; a balancing means secured to said stem remotely from said main valve and within said balancing chamber; said main valve being engageable with said apertured main seats, and said stem extending through one of said apertured main seats; an apertured spacer secured to said housing intermediate said balancing means and said main valve and receiving said stem therethrough; said housing having a port communicating with said balancing chamber intermediate said spacer and said balancing means; a bypass extending across said spacer and said port for shunting fluid from a first side of one of said spacer and port, to the opposite side of the other of said spacer and port, to thereby create a condition of equilibrium; said housing thus having a flow passage including at least said chambers, said opening, said apertured main seats, said bypass, and said port; and means including a float member acting downstream of said main seats when a liquid level to be controlled has risingly reached a predetermined point for effecting stoppage of flow through said flow passage whereby a pressure higher inside said connection chamber than outside said connection chamber drives said main valve to a first closed position; said housing having an orifice means communicating with said balancing chamber and with that side of said balancing means which is the more remote from said main valve whereby, when the liquid level has decreasingly reached a predetermined point, a pressure lower inside said connection chamber than outside said connection chamber forces fluid through said orifice means into said balancing chamber to drive said main valve to a second closed position.

2. A valve device comprising in combination, a housing having a connection chamber, a balancing chamber, and a main valve chamber intermediate said connection and balancing chambers; said housing having an opening communicating with said connection chamber for attachment of a fluid conduit thereto; said main valve chamber having a pair of apertured main seats defining ends thereof and communicating with said connection and balancing chambers; a check valve in said connection chamber positioned to impede flow from said connection chamber to said main valve chamber; said housing having a first restricted orifice means operative to permit a slight flow from said connection chamber to said main valve chamber even though said check valve may be closed; a stem movable with respect to said housing; a double-faced main valve in said chamber at one end of said stem; a balancing means secured to said stem remotely from said main valve and within said balancing chambers; said main valve being engageable with said apertured main seats, and said stem extending through one of said apertured main seats; an apertured spacer secured to said housing intermediate said balancing means and said main valve and receiving said stem therethrough; said housing having a port communicating with said balancing chamber intermediate said spacer and said balancing means; a bypass extending across said spacer and said port for shunting fluid from a first side of one of said spacer and port, to the opposite side of the other of said spacer and port, to thereby create a condition of equilibrium; said housing thus having a flow passage including at least said chambers, said opening, said apertured main seats, said bypass, and said port; and means including a float member acting downstream of said main seats when a liquid level to be controlled has risingly reached a predetermined point for effecting stoppage of flow through said flow passage whereby a pressure higher inside said connection chamber than outside said connection chamber drives said main valve to a first closed position; said housing having a second orifice means communicating with said balancing chamber and with that side of said balancing means which is the more remote from said main valve whereby, when the liquid level has decreasingly reached a predetermined point, a pressure lower inside said connection chamber than outside said connection chamber forces fluid through said second orifice means into said balancing chamber to drive said main valve to a second closed position.

3. A valve device comprising in combination, a housing having a connection chamber, a balancing chamber, and a main valve chamber intermediate said connection and balancing chambers; said housing having an opening communicating with said connection chamber for attachment of a fluid conduit thereto; said main valve chamber having a pair of apertured main seats defining ends thereof and communicating with said connection and balancing chambers; a rigid stem extending through one of said apertured main seats and movable with respect to said housing; a double-faced main valve carried by one end of said stem and engageable with said apertured main seats; a balancing disc having an effective area greater than the effective area of said main valve and secured within said balancing chamber to said rigid stem remotely from said main valve; an apertured spacer secured to said housing intermediate said balancing disc and said main valve and receiving said stem therethrough; said housing having a port communicating with said balancing chamber intermediate said spacer and said balancing disc; a bypass extending across said spacer and said port for shunting fluid from a first side of one of said apertured spacer and port to the opposite side of the other of said apertured spacer and port, said bypass having an effective flow capacity in excess of the effective flow capacity of said apertured spacer, bypass flow being directed against said balancing disc to produce a force opposite in direction to that produced by flow acting on said main valve, a valve position of equilibrium between said main seats being thereby created; float actuated means operative on rising liquid level for effecting stoppage of flow through said main seats whereby a positive pressure inside said connection chamber drives said main valve to a first closed position; said housing having an orifice means communicating with said balancing chamber and operative on decreasing ambient liquid level for effecting stoppage of flow through said main seats whereby a negative pressure inside said connection chamber draws said main valve to a second closed position.

4. A valve device comprising in combination, a housing having spaced opposed apertured main seats; a main valve located between said main seats and reciprocably movable to sealingly engage with each one of said main seats individually; a balancing disc spaced from and movable with said main valve and within said housing; said housing having a port; means defining a by-pass connecting a point in said housing adjacent to said balancing disk with a second point within said housing intermediate said port and said main valve, said by-pass enabling fluid to cooperate with said balancing disc and with said main valve during flow to create at least one condition of equilibrium with said main valve positioned intermediate said seats; an opening through said housing communicating with that side of said balance means which is the more remote from said main valve; and float actuated means for effecting stoppage of flow through said main seats; said opening and said float actuated means being separately operative to upset said condition of equilibrium.

5. In combination with a water softener brine tank, a brine tank well communicating with the tank, and a brine tank pipe, the improvement of a valve device communicatingly supported by the pipe within the well, and comprising in combination, a housing having an apertured brine flow seat and an apertured refill seat, said seats being spaced from and facing each other; a main valve located between said seats and reciprocably movable to sealingly engage with each one of said seats individually; balancing means spaced from and movable with said main valve and within said housing; said housing having a brine tank port communicating with the brine tank well; means defining a by-pass connecting a point in said housing adjacent to said balancing means with a second point within said housing intermediate said port and said main valve, said by-pass enabling fluid to cooperate with said balancing means and with said main valve during flow to create at least one condition of equilibrium whereby said main valve is positioned intermediate said seats; an opening through said housing communicating with that side of said balance means which is the more remote from said main valve; and float actuated means operative to effect stoppage of flow through said refill and brine seats; said opening and said float actuated means being separately operative to upset said position of equilibrium.

6. A valve device comprising in combination, a housing having spaced opposed main seats; a main valve located between said main seats and reciprocably movable to sealingly engage with each of said main seats individually; balancing means spaced from and movable with said main valve and within said housing; said housing having a port; means defining a by-pass connecting a point in said housing substantially on one side of said balancing means with a second point within said housing on the axially opposite side of said balancing means intermediate said port and said main valve, said by-pass enabling fluid to cooperate with said port, with said balancing means and with said main valve during flow to create at least one condition of equilibrium with said main valve positioned intermediate said seats; an opening through said housing communicating with that side of said balancing means which is the more remote from said main valve; and means including a float and line for effecting stoppage of flow through said main seats; said opening being operative to upset said condition of equilibrium when liquid surrounding said valve goes to a level below a predetermined point; said stoppage means being separately operative to upset said condition of equilibrium when the level of liquid surrounding the valve increasingly reaches a predetermined level.

7. A valve device comprising, in combination; a housing having walls defining a connection chamber, a balancing chamber, and a valve chamber intermediate said connection and balancing chambers; said housing having an opening communicating with said connection chamber for attachment of a fluid conduit thereto; said valve chamber having an apertured seat defining one end thereof adjacent to and communicating with said balancing chamber; a stem extending through said apertured seat and movable with respect to said housing; a valve carried at one end of said stem and engageable with said apertured seat; a balancing disc secured within said balancing chamber to said stem remotely from said valve; an apertured spacer secured to said housing intermediate said balancing disc and said valve and receiving said stem therethrough; said housing having a port extending through a side wall thereof and into said balancing chamber at a point in the housing wall intermediate said spacer and said balancing disc; means defining a by-pass connecting a point in said balancing chamber on one side of said balancing disk with a second point within said housing on the axially opposite side of said balancing disk and said spacer, said second point being intermediate said spacer and said valve, said by-pass being operative to shunt fluid from said seat and against that side of said balancing disc more remote from said seat to thereby create a condition of equilibrium; and float actuated means operative on rising liquid level for effecting stoppage of flow through said seat whereby a positive pressure inside said connection chamber drives said valve to a closed position.

8. A valve device comprising, in combination; a housing having walls defining a connection chamber, a balancing chamber, and a valve chamber intermediate said connection and balancing chambers; said housing having an opening communicating with said connection chamber for attachment of a fluid conduit thereto; said valve chamber having an apertured seat defining one end thereof adjacent to and communicating with said balancing chamber; a check valve in said connection chamber positioned to impede flow from said connection chamber to said valve chamber; said housing having a restricted orifice means operative to permit a slight flow from said connection chamber to said valve chamber even though said check valve may be closed; a stem extending through said apertured seat and movable with respect to said housing; a valve carried at one end of said stem and engageable with said apertured seat; a balancing disc secured within said balancing chamber to said stem remotely from said valve; an apertured spacer secured to said housing intermediate said balancing disc and said valve and receiving said stem therethrough; said housing having a port extending through a side wall thereof and into said balancing chamber at a point in the housing wall intermediate said spacer and said balancing disc; means defining a by-pass connecting a point in said balancing chamber on one side of said balancing disk with a second point within said housing on the axially opposite side of said balancing disk in said spacer, said second point being intermediate said spacer and said valve, said by-pass being operative to shunt fluid from said seat and against that side of said balancing disc more remote from said seat to thereby create a condition of equilibrium; and float actuated means operative on rising liquid level for effecting stoppage of flow through said seat whereby a positive pressure inside said connection chamber drives said valve to a closed position.

9. A suction valve device comprising, in combination, a housing having a connection chamber, a balancing chamber, and a valve chamber intermediate said connection and balancing chambers; said housing having an opening communicating with said connection chamber for attachment of a fluid conduit thereto; said valve chamber having an apertured seat defining one end thereof adjacent to and communicating with said connection chamber; a stem extending away from said apertured seat and movable with respect to said housing; a valve carried at one end of said stem and engageable with said apertured seat; a balancing disc secured within said balancing chamber to said stem remotely from said valve; an apertured spacer secured to said housing intermediate said balancing disc and said valve and receiving said stem therethrough; said housing having a port communicating with said balancing chamber intermediate said spacer and said balancing disc; and a bypass extending across said spacer and said port for shunting fluid from said port, against that side of said balancing disc which is closer to said valve and to said valve chamber to thereby create a condition of equilibrium; said housing having an orifice means communicating with said balancing chamber and operative on decreasing ambient liquid level for effecting stoppage of flow through said seat whereby a negative pressure inside said connection chamber draws said valve to a closed position.

10. A liquid level valve device comprising in combination, a freely reciprocably movable valve means; means defining a flow passage for passing liquid under pressure through the valve device for openingly moving said valve means; means comprising a balancing member remotely secured to said valve, said member being sized to permit flow of liquid past it; means defining a freely flowing bypass comprising part of said flow passage for diverting a freely flowing portion of the flow against said balancing member so as to produce a dynamic force opposite in direction to said opening movement only when there is a flow of liquid, thereby creating a condition of force equilibrium for said open valve means; and means responsive to liquid level upsetting said condition of equilibrium only when the desired level has been reached, said liquid under pressure thereby driving said valve to a closed position.

11. A valve device comprising, in combination; a housing having walls defining a connection chamber, a balancing chamber, and a main valve chamber intermediate said connection and balancing chambers; said housing having an opening communicating with said connection chamber for attachment of a fluid conduit thereto; said main valve chamber having a pair of apertured main seats defining ends thereof and communicating with said connection and balancing chambers; a rigid stem extending through one of said apertured main seats and movable with respect to said housing; a double-faced main valve carried by one end of said stem and engageable with said apertured main seats; a balancing disc having an effective area greater than the effective area of said main valve and secured within said balancing chamber to said rigid stem remotely from said main valve; an apertured spacer secured to said housing intermediate said balancing disc and said main valve and receiving said stem therethrough; said housing having a port extending through a side wall thereof and into said balancing chamber at a point in the housing wall intermediate said spacer and said balancing disc; means defining a bypass connecting a point in said balancing chamber on one side of said balancing disk with a second point within said housing on the axially opposite side of said balancing disk and said spacer, said second point being intermediate said spacer and said valve, said by-pass being operative to shunt fluid from a first side of one of said apertured spacer and port to the opposite side of the other of said apertured spacer and port, said bypass having an effective flow capacity in excess of the effective flow capacity of said apertured spacer, bypass flow being directed against said balancing disc to produce a force opposite in direction to that produced by flow acting on said main valve, a valve position of equilibrium between said main seats being thereby created; float actuated means connected with said stem and operative on rising liquid level to apply an upward force to said stem, thereby raising said main valve through said position of equilibrium, thereby permitting a positive pressure inside said connection chamber to drive said main valve to a first closed position, and thereby effecting a stoppage of flow; said housing having an orifice means communicating with said balancing chamber and operative on decreasing ambient liquid level for effecting stoppage of flow through said main seats whereby a negative pressure inside said connection chamber draws said main valve to a second closed position.

12. A valve device comprising, in combination; a housing having walls defining a connection chamber, a balancing chamber, and a main valve chamber intermediate said connection and balancing chambers; said housing having an opening communicating with said connection chamber for attachment of a fluid conduit thereto; said main valve chamber having a pair of apertured main seats defining ends thereof and communicating with said connection and balancing chambers; a rigid stem extending through one of said apertured main seats and movable with respect to said housing; a double-faced main valve carried by one end of said stem and engageable with said apertured main seats; a balancing disc having an effective area greater than the effective area of said main valve and secured within said balancing chamber to said rigid stem remotely from said main valve; an apertured spacer secured to said housing intermediate said balancing disc and said main valve and receiving said stem therethrough; said housing having a port extending through a side wall thereof and into said balancing chamber at a point in the housing wall intermediate said spacer and said balancing disc; means defining a by-pass connecting a point in said balancing chamber on one side of said balancing disc with a second point within said housing on the axially opposite side of said balancing disc and said spacer, said second point being intermediate said spacer and said valve, said by-pass being operative to shunt a fluid from a first side of one of said apertured spacer and port to the opposite side of the other of said apertured spacer and port, said bypass having an effective flow capacity in excess of the effective flow capacity of said apertured spacer, bypass flow being directed against said balancing disc to produce a force opposite in direction to that produced by flow acting on said main valve, a valve position of equilibrium between said main seats being thereby created; a trigger chamber having an upwardly directed opening and communicating with said port; non-buoyant float-actuated means within said trigger chamber and operative on rising liquid level to close said upwardly directed opening, thereby interrupting flow and upsetting said equilibrium, and thereby permitting a positive pressure inside said connection chamber to drive said main valve to a first closed position; said housing having an orifice means communicating with said balancing chamber and operative on decreasing ambient liquid level for effecting stoppage of flow through said main seats whereby a negative pressure inside said connection chamber draws said main valve to a second closed position.

13. A valve device comprising, in combination; a housing having walls defining a connection chamber, a balancing chamber, and a main valve chamber intermediate said connection and balancing chambers; said housing having an opening communicating with said connection chamber for attachment of a fluid conduit thereto; said main valve chamber having a pair of apertured main seats defining ends thereof and communicating with said connection and balancing chambers; a rigid stem extending through one of said apertured main seats and movable with respect to said housing; a double-faced main valve carried by one end of said stem and engageable with said apertured main seats; a balancing disc having an effective area greater than the effective area of said main valve and secured within said balancing chamber to said rigid stem remotely from said main valve; an apertured spacer secured to said housing intermediate said balancing disc and said main valve and receiving said stem therethrough; said housing having a port extending through a side wall thereof and into said balancing chamber at a point in the housing wall intermediate said spacer and said balancing disc; means defining a by-pass connecting a point in said balancing chamber on one side of said balancing disk with a second point within said housing on the axially opposite side of said balancing disk and said spacer, said second point being intermediate said spacer and said valve, said by-pass being operative to shunt from a first side of one of said apertured spacer and port to the opposite side of the other of said apertured spacer and port, said bypass comprising a chamber external to said balancing chamber, said bypass having an effective flow capacity in excess of the effective flow capacity of said apertured spacer, bypass flow being directed against said balancing disc to produce a force opposite in direction to that produced by flow acting on said main valve, a valve position of equilibrium between said main seats being thereby created; float actuated means operative on rising liquid level for effecting stoppage of flow through said main seats whereby a positive pressure inside said connection chamber drives said main valve to a first closed position; said housing having an orifice means communicating with said balancing chamber and operative on decreasing ambient liquid level for effecting stoppage of flow through said main seats whereby a negative pressure inside said connection chamber draws said main valve to a second closed position.

14. A valve device comprising in combination; a housing having walls defining a connection chamber, a balancing chamber, and a main valve chamber intermediate said connection and balancing chambers; said housing having an opening communicating with said connection chamber for attachment of a fluid conduit thereto; said main valve chamber having a pair of apertured main seats defining ends thereof and communicating with said connection and balancing chambers; a rigid stem extending through one of said apertured main seats and movable with respect to said housing; a double-faced main valve carried by one end of said stem and engageable with said apertured main seats; a balancing disc having an effective area greater than the effective area of said main valve and secured within said balancing chamber to said rigid stem remotely from said main valve; an apertured spacer secured to said housing intermediate said balancing disc and said main valve and receiving said stem therethrough; said housing having a port extending through a side wall thereof and into said balancing chamber at a point in the housing wall intermediate said spacer and said balancing disc; means defining a by-pass connecting a point in said balancing chamber on one side of said balancing disk with a second point within said housing on the axially opposite side of said balancing disk and said spacer, said second point being intermediate said spacer and said valve, said by-pass being operative to shunt fluid from a first side of one of said apertured spacer and port to the opposite side of the other of said apertured spacer and port, said bypass comprising a passage within said stem, said bypass having an effective flow capacity in excess of the effective flow capacity of said apertured spacer, bypass flow being directed against said balancing disc to produce a force opposite in direction to that produced by flow acting on said main valve, a valve position of equilibrium between said main seats being thereby created; float actuated means operative on rising liquid level for effecting stoppage of flow through said main seats whereby a positive pressure inside said connection chamber drives said main valve to a first closed position; said housing having an orifice means communicating with said balancing chamber and operative on decreasing ambient liquid level for effecting stoppage of flow through said main seats whereby a negative pressure inside said connection chamber draws said main valve to a second closed position.

15. A valve device comprising in combination; a housing having walls defining a connection chamber, a balancing chamber, and a main valve chamber intermediate said connection and balancing chambers; said housing having an opening communicating with said connection chamber for attachment of a fluid conduit thereto; said main valve chamber having a pair of apertured main seats defining ends thereof and communicating with said connection and balancing chambers; a rigid stem extending through one of said apertured main seats and movable with respect to said housing; a double-faced main valve carried by one end of said stem and engageable with said apertured main seats; a balancing disc having an effective area greater than the effective area of said main valve and secured within said balancing chamber to said rigid stem remotely from said main valve; an apertured spacer secured to said housing intermediate said balancing disc and said main valve and receiving said stem therethrough; said housing having a port extending through a side wall thereof and into said balancing chamber at a point in the housing wall intermediate said spacer and said balancing disc; means defining a by-pass connecting a point in said balancing chamber on one side of said balancing disk with a second point within said housing on the axially opposite side of said balancing disk and said spacer, said second point being intermediate said spacer and said valve, said by-pass being operative to shunt fluid from a first side of one of said apertured spacer and port to the opposite side of the other of said apertured spacer and port, said bypass having an effective flow capacity in excess of the effective flow capacity of said apertured spacer, bypass flow being directed against said balancing disc to produce a force opposite in direction to that produced by flow acting on said main valve, a valve position of equilibrium between said main seats being thereby created; float actuated means operative on rising liquid level for effecting stoppage of flow through said main seats whereby a positive pressure inside said connection chamber drives said main valve to a first closed position; a trigger chamber having an upwardly directed opening and communicating with said port; a buoyant means guided to register with the upper side of said opening, and operative on decreasing liquid level to close said upwardly directed opening, thereby interrupting flow and upsetting said equilibrium; said housing having an orifice means communicating with said balancing chamber whereby a negative pressure inside said connection chamber draws liquid through said orifice means and thereby drives said main valve to a second closed position.

16. A valve device comprising in combination; a housing having walls defining a connection chamber, a balancing chamber, and a main valve chamber intermediate said connection and balancing chambers; said housing having an opening communicating with said connection chamber for attachment of a fluid conduit thereto; said main valve chamber having a pair of apertured main seats defining ends thereof and communicating with said connection and balancing chambers; a rigid stem extending through one of said apertured main seats and movable with respect to said housing; a double-faced main valve carried by one end of said stem and engageable with said apertured main seats; a balancing disc having an effective area greater than the effective area of said main valve and secured within said balancing chamber to said rigid stem remotely from said main valve; an apertured spacer secured to said housing intermediate said balancing disc and said main valve and receiving said stem therethrough; said housing having a port extending through a side wall thereof and into said balancing chamber at a point in the housing wall intermediate said spacer and said balancing disc; means defining a by-pass connecting a point in said balancing chamber on one side of said balancing disk with a second point within said housing on the axially opposite side of said balancing disk and said spacer, said second point being intermediate said spacer and said valve, said by-pass being operative to shunt fluid from a first side of one of said apertured spacer and port to the opposite side of the other of said apertured spacer and port, said bypass having an effective flow capacity in excess of the effective flow capacity of said apertured spacer, bypass flow being directed against said balancing disc to produce a force opposite in direction to that produced by flow acting on said main valve, a valve position of equilibrium between said main seats being thereby created; a trigger chamber having an upwardly directed opening and communicating with said port; non-buoyant means within said trigger chamber for closing said opening from within; a float actuated line secured to said non-buoyant means and extending through said upwardly directed opening, said line and said non-buoyant means being operative on rising liquid level to close said upwardly directed opening, thereby interrupting flow and upsetting said equilibrium, and thereby permitting a positive pressure inside said connection chamber to drive said main valve to a first closed position; a buoyant means guided by said line above said upwardly directed opening, and operative on decreasing liquid level to close said upwardly directed opening, thereby interrupting flow and upsetting said equilibrium; said housing having an orifice means communicating with said balancing chamber whereby a negative pressure inside said connection chamber draws liquid through said orifice means and thereby drives said main valve to a second closed position.

17. A valve device comprising in combination; a housing having walls defining a connection chamber, a balancing chamber, and a main valve chamber intermediate said connection and balancing chambers; said housing having an opening communicating with said connection chamber for attachment of a fluid conduit thereto; said main valve chamber having a pair of apertured main seats defining ends thereof and communicating with said connection and balancing chambers; a rigid stem extending through one of said apertured main seats and movable with respect to said housing; a double-faced main valve carried by one end of said stem and engageable with said apertured main seats; a balancing disc having an effective area greater than the effective area of said main valve and secured within said balancing chamber to said rigid stem remotely from said main valve; an apertured spacer secured to said housing intermediate said balancing disc and said main valve and receiving said stem therethrough; said housing having a port extending through a side wall thereof and into said balancing chamber at a point in the housing wall intermediate said spacer and said balancing disc; means defining a by-pass connecting to a point in said balancing chamber on one side of said balancing disk with a second point within said housing on the axially opposite side of said balancing disk and said spacer, said second point being intermediate said spacer and said valve, said by-pass being operative to shunt fluid from a first side of one of said apertured spacer and port to the opposite side of the other of said apertured spacer and port, said bypass having an effective flow capacity in excess of the effective flow capacity of said apertured spacer, bypass flow being directed against said balancing disc to produce a force opposite in direction to that produced by flow acting on said main valve, a valve position of equilibrium between said main seats being thereby created; a trigger chamber having an upwardly directed opening and communicating with said port; non-buoyant means within said trigger chamber for closing said opening from within; an ear carried by said housing and having an opening spaced above and aligned with said upwardly directed opening of said trigger chamber; a float actuated line secured to said non-buoyant means and extending through said openings, said line and said non-buoyant means being operative on rising liquid level to close said upwardly directed opening, thereby interrupting flow and upsetting said equilibrium, and thereby permitting a positive pressure inside said connection chamber to drive said main valve to a first closed position; a buoyant means guided by said line between said ear and said upwardly directed opening, and operative on decreasing liquid level to close said upwardly directed opening, thereby interrupting flow and upsetting said equilibrium; said housing having an orifice means communicating with said balancing chamber whereby a negative pressure inside said connection chamber draws liquid through said orifice means and thereby drives said main valve to a second closed position.

18. A liquid level valve device for a water softener brine tank comprising in combiantion, a freely reciprocably movable stem and valve assembly, said assembly including a valve means, a stem means, and a balancing means sized to permit flow of liquid past it; said valve means and said balancing means being secured to said stem means remotely from each other; means defining a flow passage for passing liquid under pressure through the valve device for openingly moving said valve means; means defining a bypass comprising part of said flow passage for diverting a freely flowing portion of the flow against said balancing means so as to produce a dynamic force opposite in direction to said opening movement only when there is a flow of liquid, thereby creating a condition of force equilibrium for said open valve means; said stem and valve assembly having a specific gravity intermediate the specific gravities of water and of saturated brine solution; and means responsive to liquid level upsetting said condition of equilibrium only when the desired level has been reached, said liquid under pressure thereby driving said valve to a closed position.

19. A valve device comprising, in combination; a housing having walls defining a connection chamber, a main valve chamber adjacent thereto, and a balancing chamber positioned above the main valve chamber; said housing having an opening communicating with said connection chamber for attachment of a fluid conduit thereto; said main valve chamber having a pair of apertured main seats defining ends thereof and communicating with said connection and balancing chambers; a stem movable with respect to said housing; a double-faced main valve at one end of said stem; a balancing means; said balancing means being secured to a portion of said stem which extends upwardly from said main valve into said balancing chamber; said main valve being engageable with said apertured main seats, and said stem extending through one of said apertured main seats; an apertured spacer secured to said housing intermediate said balancing means and said main valve and receiving said stem therethrough; said housing having a port extending through a side wall thereof and into said balancing chamber at a point in the housing wall intermediate said spacer and said balancing means; means defining a by-pass connecting a point in said balancing chamber on one side of said balancing means with a second point within said housing on the axially opposite side of said balancing means in said spacer, said second point being intermediate said spacer and said valve, said by-pass being operative to shunt fluid from a first side of one of said apertured spacer and port to the opposite side of the other of said apertured spacer and port, said bypass having an effective flow capacity in excess of the effective flow capacity of said apertured spacer, bypass flow being directed against said balancing means to produce a force opposite in direction to that produced by flow acting on said main valve, a valve position of equilibrium between said main seats being thereby created; float actuated means operative on rising liquid level for effecting stoppage of flow through said main seats whereby a positive pressure inside said connection chamber drives said main valve to a first closed position; said housing having an orifice means communicating with said balancing chamber and operative on decreasing ambient liquid level for effecting stoppage of flow through said main seats whereby a negative pressure inside said connection chamber draws said main valve to a second closed position.

20. A valve device comprising in combination; a housing having walls defining a connection chamber, a main valve chamber adjacent thereto, and a balancing chamber positioned below the main valve chamber; said housing having an opening communicating with said connection chamber for attachment of a fluid conduit thereto; said main valve chamber having a pair of apertured main seats defining ends thereof and communicating with said connection and balancing chambers; a stem movable with respect to said housing; a double-faced main valve at one end of said stem; a balancing means; said balancing means being secured to a portion of said stem which extends downwardly from said main valve into said balancing chamber; said main valve being engageable with said apertured main seats, and said stem extending through one of said apertured main seats; an apertured spacer secured to said housing intermediate said balancing means and said main valve and receiving said stem therethrough; said housing having a port extending through a side wall thereof and into said balancing chamber at a point in the housing wall intermediate said spacer and said balancing means; means defining a by-pass connecting a point in said balancing chamber on one side of said balancing means with a second point within said housing on the axially opposite side of said balancing means in said spacer, said second point being intermediate said spacer and said valve, said by-pass being operative to shunt fluid from a first side of one of said apertured spacer and port to the opposite side of the other of said apertured spacer and port, said bypass having an effective flow capacity in excess of the effective flow capacity of said apertured spacer, bypass flow being directed against said balancing means to produce a force opposite in direction to that produced by flow acting on said main valve, a valve position of equilibrium between said main seats being thereby created; float actuated means operative on rising liquid level for effecting stoppage of flow through said main seats whereby a positive pressure inside said connection chamber drives said main valve to a first closed position; said housing having an orifice means communicating with said balancing chamber and operative on decreasing ambient liquid level for effecting stoppage of flow through said main seats whereby a negative pressure inside said connection chamber draws said main valve to a second closed position.

21. A valve device comprising in combination, a housing having spaced opposed main seats; a main valve located between said main seats and reciprocably movable to sealingly engage with each of said main seats individually; balancing means spaced from and movable with said main valve and within said housing; said housing having a plurality of ports whose axes lie in a substantially common plane; means defining a by-pass connecting a point in said housing adjacent to said balancing means with a second point within said housing intermediate said plane and said main valve, said by-pass enabling fluid to cooperate with said ports, with said balancing means and with said main valve during flow to create at least one condition of equilibrium with said main valve positioned intermediate said seats; an opening through said housing communicating with that side of said balancing means which is the more remote from said main valve; and means including a float and line for effecting stoppage of flow through said main seats; said opening being operative to upset said condition of equilibrium when liquid surrounding said valve goes to a level below a predetermined point; said stoppage means being separately operative to upset said condition of equilibrium when the level of liquid surrounding the valve increasingly reaches a predetermined level.

22. A valve device comprising in combination, a housing having a connection chamber, a balancing chamber, and a main valve chamber intermediate said connection and balancing chambers; said housing having an opening communicating with said connection chamber for attachment of a fluid conduit thereto; said main valve chamber having a pair of apertured main seats defining ends thereof and communicating with said connection and balancing chambers; a rigid stem extending through one of said apertured main seats and movable with respect to said housing; a double-faced main valve carried by one end of said stem and engageable with said apertured main seats; a balancing means having an effective area greater than the effective area of said main valve and secured within said balancing chamber to said rigid stem remotely from said main valve; an apertured spacer secured to said housing intermediate said balancing means and said main valve and receiving said stem therethrough; said housing having a pair of ports communicating with said balancing chamber intermediate said spacer and said balancing means; a bypass extending across said spacer and said ports for shunting fluid from a first side of one of said apertured spacer and ports to the opposite side of the other of said apertured spacer and ports, said bypass having an effective flow capacity in excess of the effective flow capacity of said apertured spacer, bypass flow being directed against said balancing means to produce a force opposite in direction to that produced by flow acting on said main valve, a valve position of equilibrium between said main seats being thereby created; a pair of trigger chambers each communicating with one of said ports and each having an upwardly directed opening; non-buoyant means within each of said trigger chambers for closing each of said openings from within; upper means above each of said openings for closing said chambers from above and spacedly secured to said non-buoyant means through each of said upwardly directed openings, one of said upper means being buoyant and the other being non-buoyant; a float-actuated line secured to said upper non-buoyant means, said line and said buoyant means being respectively operative on rising liquid level to raise each of said non-buoyant means within each of said trigger chambers to close said upwardly directed openings, thereby interrupting flow and upsetting said equilibrium, and thereby permitting a positive pressure inside said connection chamber to drive said main valve to a first closed position; said non-buoyant means within each of said trigger chambers being operative on decreasing liquid level to draw downward said means to which each is connected to close said upwardly directed openings, thereby interrupting flow and upsetting said equilibrium; said housing having an orifice means communicating with said balancing chamber whereby a negative pressure inside said connection chamber draws liquid through said orifice means and thereby drives said main valve to a second closed position.

23. A liquid level valve device comprising in combination: a freely reciprocably movable valve means; means defining a flow passage for passing liquid under pressure through the valve device for openingly moving said valve means; means comprising a balancing member remotely secured to said valve, said member being sized to permit flow of liquid past it; means comprising part of said flow passage for directing a liquid stream to impinge against said balancing member so as to produce a dynamic force opposite in direction to said opening movement only when there is a flow of liquid, thereby creating a condition of force equilibrium on said open valve means; and means responsive to liquid level for interrupting said impinging only when the desired level has been reached, said liquid under pressure thereby driving said valve to a closed position.

References Cited in the file of this patent

UNITED STATES PATENTS

| | | |
|---|---|---|
| 226,224 | Demarest | Apr. 6, 1880 |
| 351,835 | Kelley | Nov. 2, 1886 |
| 476,511 | Birkery | June 7, 1892 |
| 730,951 | Mumford et al. | June 16, 1903 |
| 2,695,626 | Riche | Nov. 30, 1954 |
| 2,710,018 | Wolfe | June 7, 1955 |
| 2,716,422 | Whitlock | Aug. 3, 1955 |